(12) United States Patent
Hsieh et al.

(10) Patent No.: US 12,020,400 B2
(45) Date of Patent: Jun. 25, 2024

(54) UPSAMPLING AND REFINING SEGMENTATION MASKS

(71) Applicant: Adobe Inc., San Jose, CA (US)

(72) Inventors: Chih-Yao Hsieh, San Jose, CA (US); Yilin Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 317 days.

(21) Appl. No.: 17/585,140

(22) Filed: Jan. 26, 2022

(65) Prior Publication Data

US 2023/0132180 A1 Apr. 27, 2023

Related U.S. Application Data

(60) Provisional application No. 63/271,149, filed on Oct. 23, 2021.

(51) Int. Cl.
*G06K 9/00* (2022.01)
*G06T 3/4046* (2024.01)
(Continued)

(52) U.S. Cl.
CPC .......... *G06T 3/4076* (2013.01); *G06T 3/4046* (2013.01); *G06T 5/30* (2013.01);
(Continued)

(58) Field of Classification Search
CPC ..... G06T 3/4076; G06T 7/155; G06T 3/4046; G06T 5/004; G06T 5/30; G06V 10/806
See application file for complete search history.

(56) References Cited

U.S. PATENT DOCUMENTS

| 5,214,744 A | 5/1993 | Schweizer et al. |
| 7,295,700 B2 | 11/2007 | Schiller et al. |

(Continued)

FOREIGN PATENT DOCUMENTS

| CN | 106022273 A | 10/2016 |
| CN | 106339591 A | 1/2017 |

(Continued)

OTHER PUBLICATIONS

Zhou, Peng, et al. "Deepstrip: High-resolution boundary refinement." Proceedings of the IEEE/CVF conference on computer vision and pattern recognition. 2020. (Year: 2020).*

(Continued)

*Primary Examiner* — Avinash Yentrapati
(74) *Attorney, Agent, or Firm* — Keller Preece PLLC

(57) ABSTRACT

The present disclosure relates to systems, methods, and non-transitory computer-readable media that upsample and refine segmentation masks. Indeed, in one or more implementations, a segmentation mask refinement and upsampling system upsamples a preliminary segmentation mask utilizing a patch-based refinement process to generate a patch-based refined segmentation mask. The segmentation mask refinement and upsampling system then fuses the patch-based refined segmentation mask with an upsampled version of the preliminary segmentation mask. By fusing the patch-based refined segmentation mask with the upsampled preliminary segmentation mask, the segmentation mask refinement and upsampling system maintains a global perspective and helps avoid artifacts due to the local patch-based refinement process.

20 Claims, 12 Drawing Sheets

(51) Int. Cl.
*G06T 3/4076* (2024.01)
*G06T 5/30* (2006.01)
*G06T 5/75* (2024.01)
*G06T 7/155* (2017.01)
*G06V 10/80* (2022.01)

(52) U.S. Cl.
CPC ............... *G06T 5/75* (2024.01); *G06T 7/155* (2017.01); *G06V 10/806* (2022.01)

(56) References Cited

U.S. PATENT DOCUMENTS

| | | | |
|---|---|---|---|
| 7,606,417 | B2 | 10/2009 | Steinberg et al. |
| 7,916,917 | B2 | 3/2011 | Dewaele et al. |
| 8,600,143 | B1 | 12/2013 | Kulkarni et al. |
| 8,675,934 | B2 | 3/2014 | Wehnes et al. |
| 9,251,429 | B2 | 2/2016 | Pham et al. |
| 9,336,483 | B1 | 5/2016 | Abeysooriya et al. |
| 9,342,869 | B2 * | 5/2016 | Wang ..................... G06T 5/60 |
| 9,418,319 | B2 | 8/2016 | Shen et al. |
| 9,495,756 | B2 | 11/2016 | Rivet-Sabourin |
| 9,684,967 | B2 | 6/2017 | Abedini et al. |
| 10,192,129 | B2 | 1/2019 | Price et al. |
| 10,210,613 | B2 | 2/2019 | Xu et al. |
| 10,460,214 | B2 | 10/2019 | Lu et al. |
| 10,470,510 | B1 | 11/2019 | Koh et al. |
| 10,643,331 | B2 | 5/2020 | Ghesu et al. |
| 10,679,046 | B1 | 6/2020 | Black et al. |
| 10,846,566 | B2 | 11/2020 | Zhu et al. |
| 11,335,004 | B2 | 5/2022 | Liu et al. |
| 2001/0051852 | A1 | 12/2001 | Sundaravel et al. |
| 2003/0081833 | A1 | 5/2003 | Tilton |
| 2004/0042662 | A1 | 3/2004 | Wilensky et al. |
| 2004/0190092 | A1 | 9/2004 | Silverbrook et al. |
| 2004/0202368 | A1 | 10/2004 | Lee et al. |
| 2006/0015373 | A1 | 1/2006 | Cuypers |
| 2006/0045336 | A1 | 3/2006 | Lim |
| 2006/0285743 | A1 | 12/2006 | Oh et al. |
| 2007/0165949 | A1 | 7/2007 | Sinop et al. |
| 2009/0252429 | A1 | 10/2009 | Prochazka et al. |
| 2010/0183225 | A1 | 7/2010 | Vantaram et al. |
| 2010/0226566 | A1 | 9/2010 | Luo et al. |
| 2010/0322488 | A1 | 12/2010 | Virtue et al. |
| 2011/0188720 | A1 | 8/2011 | Narayanan et al. |
| 2011/0216975 | A1 | 9/2011 | Rother et al. |
| 2011/0285874 | A1 | 11/2011 | Showering et al. |
| 2012/0201423 | A1 | 8/2012 | Onai et al. |
| 2014/0010449 | A1 | 1/2014 | Haaramo et al. |
| 2014/0056472 | A1 | 2/2014 | Gu |
| 2014/0334667 | A1 | 11/2014 | Eswara et al. |
| 2015/0117783 | A1 | 4/2015 | Lin et al. |
| 2015/0269427 | A1 | 9/2015 | Kim et al. |
| 2016/0232425 | A1 | 8/2016 | Huang et al. |
| 2017/0032551 | A1 | 2/2017 | Fried et al. |
| 2017/0039723 | A1 * | 2/2017 | Price ..................... G06T 7/174 |
| 2017/0068416 | A1 | 3/2017 | Li |
| 2017/0116497 | A1 | 4/2017 | Georgescu et al. |
| 2017/0140236 | A1 | 5/2017 | Price et al. |
| 2017/0169313 | A1 | 6/2017 | Choi et al. |
| 2017/0169567 | A1 | 6/2017 | Chefd'Hotel et al. |
| 2017/0213349 | A1 | 7/2017 | Kuo et al. |
| 2017/0231550 | A1 | 8/2017 | Do et al. |
| 2017/0244908 | A1 | 8/2017 | Flack et al. |
| 2017/0249739 | A1 | 8/2017 | Kallenberg et al. |
| 2017/0287137 | A1 | 10/2017 | Lin et al. |
| 2018/0061046 | A1 | 3/2018 | Bozorgtabar et al. |
| 2018/0108137 | A1 | 4/2018 | Price et al. |
| 2018/0137335 | A1 | 5/2018 | Kim et al. |
| 2018/0182101 | A1 | 6/2018 | Petersen et al. |
| 2018/0240243 | A1 | 8/2018 | Kim et al. |
| 2019/0057507 | A1 | 2/2019 | El-Khamy et al. |
| 2019/0108414 | A1 | 4/2019 | Price et al. |
| 2019/0236394 | A1 | 4/2019 | Price et al. |
| 2019/0130229 | A1 | 5/2019 | Lu et al. |
| 2019/0236786 | A1 | 8/2019 | McNerney et al. |
| 2019/0340462 | A1 | 11/2019 | Pao et al. |
| 2019/0357615 | A1 | 11/2019 | Koh et al. |
| 2020/0020108 | A1 | 1/2020 | Pao et al. |
| 2020/0143194 | A1 | 5/2020 | Hou et al. |
| 2020/0167930 | A1 | 5/2020 | Wang et al. |
| 2020/0218961 | A1 | 7/2020 | Kanazawa et al. |
| 2020/0388071 | A1 | 12/2020 | Grabner et al. |
| 2021/0027098 | A1 | 1/2021 | Ge et al. |
| 2021/0082118 | A1 | 3/2021 | Zhang et al. |
| 2021/0158043 | A1 | 5/2021 | Hou et al. |
| 2021/0217178 | A1 | 7/2021 | Terzopoulos et al. |
| 2021/0248748 | A1 | 8/2021 | Turgutlu et al. |
| 2021/0290096 | A1 | 9/2021 | Yang |
| 2021/0295507 | A1 | 9/2021 | Nie |
| 2022/0044366 | A1 | 2/2022 | Zhang et al. |
| 2022/0044407 | A1 | 2/2022 | Liu et al. |
| 2022/0108454 | A1 | 4/2022 | Tsai et al. |
| 2022/0237799 | A1 | 7/2022 | Price et al. |
| 2022/0262009 | A1 | 8/2022 | Yu et al. |
| 2022/0292684 | A1 | 9/2022 | Wang et al. |
| 2022/0375079 | A1 | 11/2022 | Finley et al. |
| 2023/0281763 | A1 * | 9/2023 | Zhang ..................... G06T 5/75 |
| | | | 382/260 |

FOREIGN PATENT DOCUMENTS

| | | |
|---|---|---|
| CN | 107103315 A | 8/2017 |
| CN | 110232689 A | 9/2019 |
| DE | 102015207047 A1 | 10/2015 |
| WO | 2015/177268 A1 | 11/2015 |
| WO | 2018/229490 A1 | 12/2018 |

OTHER PUBLICATIONS

Chang, Yong, et al. "Accurate pelvis and femur segmentation in hip CT with a novel patch-based refinement." IEEE journal of biomedical and health informatics 23.3 (2018): 1192-1204. (Year: 2018).*
Costea, Arthur Daniel, Andra Petrovai, and Sergiu Nedevschi. "Fusion scheme for semantic and instance-level segmentation." 2018 21st International Conference on Intelligent Transportation Systems (ITSC). IEEE, 2018. (Year: 2018).*
Yang et al., Meticulous Object Segmentation, Dec. 13, 2020, available at https://arxiv.org/pdf/2012.07181.pdf.
He et al. in Guided Image Filtering, IEEE Transactions on Pattern Analysis and Machine Intelligence, vol. 35, 2013.
He et al. in Fast Guided Filter, Computer Vision and Pattern Recognition, arXiv:1505.00996, 2015.
Ning Xu et al., "Deep GrabCut for Object Selection," published Jul. 14, 2017.
Zhao et al., in Pyramid scene parsing network, In Proceedings of the IEEE conference on computer vision and pattern recognition, pp. 2881-2890, 2017.
He et al. in Deep Residual Learning for Image Recognition in Proceedings of the IEEE conference on computer vision and pattern recognition, pp. 770-778, 2016.
Howard et al., in Searching For Mobilenetv3, in Proceedings of the IEEE International Conference on Computer Vision, pp. 1314-1324, 2019.
Office Action as received in CN application 201810886944.1 dated Dec. 29, 2023.
Zhang, Y., Li, X., Lin, M., Chiu, B., & Zhao, M. (2020). Deep-recursive residual network for image semantic segmentation. Neural computing and applications, 32, 12935-12947.
U.S. Appl. No. 17/200,525, filed Sep. 5, 2023, Notice of Allowance.
A. Criminisi, T. Sharp, and A. Blake. GeoS: Geodesic image segmentation. In ECCV, pp. 99-112, 2008.
A. Guzman-rivera, D. Batra, and P. Kohli. Multiple choice learning: Learning to produce multiple structured outputs. In F. Pereira, C. J. C. Burges, L. Bottou, and K. Q. Weinberger, editors, NIPS, pp. 1799-1807. 2012.
Alex Krizhevsky, Ilya Sutskever, and Geoffrey E Hinton. Imagenet classification with deep convolutional neural networks. In Advances in neural information processing systems, pp. 1097-1105, 2012.

(56) References Cited

OTHER PUBLICATIONS

Alexander Kirillov, Yuxin Wu, Kaiming He, and Ross Girshick. Pointrend: Image segmentation as rendering. In Proceedings of the IEEE/CVF Conference on Computer Vision and Pattern Recognition, pp. 9799-9808, 2020.
Ali Borji and Laurent Itti. State-of-the-art in visual attention modeling. IEEE transactions on pattern analysis and machine intelligence, 35(1):185-207, 2012.
Ali Borji, Ming-Ming Cheng, Qibin Hou, Huaizu Jiang, and Jia Li. Salient object detection: A survey. Computational visual media, pp. 1-34, 2019.
B. Hariharan, P. Arbelaez, L. Bourdev, S. Maji, and J. Malik. Semantic contours from inverse detectors. 2011.
B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.
B. Zhou, H. Zhao, X. Puig, S. Fidler, A. Barriuso, and A. Torralba. Scene parsing through ade20k dataset. In Proceedings of the IEEE Conference on Computer Vision and Pattern Recognition, 2017.
C. Rother, V. Kolmogorov, and A. Blake. Grabcut: Interactive foreground extraction using iterated graph cuts. ACM Transactions on Graphics (TOG), 23(3):309-314, 2004.
Chao Peng, Xiangyu Zhang, Gang Yu, Guiming Luo, and Jian Sun. Large kernel matters—improve semantic segmentation by global convolutional network. In Proceedings of the IEEE conference on computer vision and pattern recognition, pp. 4353-4361, 2017.
Chen et al., 'DISC: Deep Image Saliency Computing via Progressive Representation Learning', 2016, IEEE Transactions on Neural Networks and Learning Systems, vol. 27, No. 6, pp. 1135-1149 (Year: 2016).
Chen, Liang-Chieh et al. "Rethinking Atrous Convolution for Semantic Image Segmentation." ArXiv abs/1706.05587 (2017): n. pag.
Cheng, Ho & Chung, Jihoon & Tai, Yu-Wing & Tang, Chi-Keung. (2020). CascadePSP: Toward Class-Agnostic and Very High-Resolution Segmentation via Global and Local Refinement. arXiv:2005.02551v1 [cs.CV] May 6, 2020.
Chi Zhang, Guosheng Lin, Fayao Liu, Rui Yao, and Chunhua Shen. Canet: Class-agnostic segmentation networks with iterative refinement and attentive few-shot learning. In Proceedings of the IEEE Conference on Computer Vision and Pattern Recognition, pp. 5217-5226, 2019.
Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In Proceedings of the IEEE conference on computer vision and pattern recognition, pp. 1-9, 2015.
Chuan Yang, Lihe Zhang, Huchuan Lu, Xiang Ruan, and Ming-Hsuan Yang. Saliency detection via graph-based manifold ranking. In Proceedings of the IEEE conference on computer vision and pattern recognition, pp. 3166-3173, 2013.
Combined Search & Examination Report as received in UK application GB1813276.1 dated Feb. 14, 2019.
Combined Search and Examination Report as received in UK application GB1915436.8 dated Aug. 12, 2020.
D. Acuna, H. Ling, A. Kar, and S. Fidler. Efficient interactive annotation of segmentation datasets with Polygon-RNN++. In CVPR, 2018.
D. Batra, P. Yadollahpour, A. Guzman-Rivera, and G. Shakhnarovich. Diverse m-best solutions in markov random fields. In ECCV, 2012.
D. Freedman and T. Zhang. Interactive graph cut based segmentation with shape priors. In IEEE CVPR, vol. 1, pp. 755-762. IEEE, 2005.
Dominik A Klein and Simone Frintrop. Center-surround divergence of feature statistics for salient object detection. In 2011 International Conference on Computer Vision, pp. 2214-2219. IEEE, 2011.
E. N. Mortensen and W. A. Barrett. Intelligent scissors for image composition. In Proceedings of the 22nd annual conference on Computer graphics and interactive techniques, pp. 191-198, 1995.
Examination Report as received in Australian application 2019250107 dated Nov. 5, 2021.
Examination Report as received in Australian application 2019250107 dated Oct. 14, 2021.
Farag, A.—"A Bottom-up Approach for Pancreas Segmentation using Cascaded Superpixels and (Deep) Image Patch Labeling" - May 22, 2015—Elsevier Journal of Medical Image Analysis, pp. 1-21.
G. Lin, C. Shen, I. Reid, et al. Efficient piecewise training of deep structured models for semantic segmentation. arXiv preprint arXiv:1504.01013, 2015.
Gao Huang, Zhuang Liu, Kilian Q. Weinberger, and Laurens V.D. Maaten; "Densely connected convolutional networks," In arXiv:1608.06993v3, 2016.
Gao Huang, Zhuang Liu, Laurens Van Der Maaten, and Kilian Q Weinberger. Densely connected convolutional networks. In Proceedings of the IEEE conference on computer vision and pattern recognition, pp. 4700-4708, 2017.
Guanbin Li and Yizhou Yu. Visual saliency based on multi-scale deep features. In Proceedings of the IEEE conference on computer vision and pattern recognition, pp. 5455-5463, 2015.
Guo, Z.—"Medical Image Segmentation Based on Multi-Modal Convolutional Neural Network: Study on Image Fusion Schemes"—arXiv—Nov. 2, 2017—pp. 1-10 (Year: 2017).
Guo, Z.—"Deep Learning-Based Image Segmentation on Multimodal Medical Imaging"—IEEE—Mar. 1, 2019—pp. 162-169 ( Year: 2019).
Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.
Guosheng Lin, Chunhua Shen, Anton Van Den Hengel, and Ian Reid. Efficient piecewise training of deep structured models for semantic segmentation. In Proceedings of the IEEE conference on computer vision and pattern recognition, pp. 3194-3203, 2016.
H. Le, L. Mai, B. Price, S. Cohen, H. Jin, and F. Liu. Interactive boundary prediction for object selection. In ECCV, Sep. 2018.
Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.
Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.
IEEE Conference on Computer Vision and Pattern Recognition (CVPR), 2016, Liang Chieh Chen et al, "Attention to Scale: Scale-Aware Semantic Image Segmentation", pp. 3640-3649 abstract 1. 7-9 and p. 2 left col. 1st paragraph starting at "In particular . . . ", 1.4-7, Sec. 3.1, Fig. 5 column (c).
IEEE/CVF International Conference on Computer Vision (ICCV), 2019, Liew Jun Hao et al, "MultiSeg: Semantically Meaningful, Scale-Diverse Segmentations From Minimal User Input", pp. 662-670 the whole document.
Intention to Grant as received in UK application GB1915436.8 dated Aug. 25, 2021.
J. H. Liew, Y. Wei, W. Xiong, S .- H. Ong, and J. Feng. Regional interactive image segmentation networks. In IEEE ICCV, Oct. 2017.
J. Long, E. Shelhamer, and T. Darrell. Fully convolutional networks for semantic segmentation. arXiv preprint arXiv: 1411.4038, 2014.
J. Redmon, S. Divvala, R. Girshick, and A. Farhadi. You only look once: Unified, real-time object detection. In Proceedings of the IEEE conference on computer vision and pattern recognition, pp. 779-788, 2016.
Jia-Xing Zhao, Jiang-Jiang Liu, Deng-Ping Fan, Yang Cao, Jufeng Yang, and Ming-Ming Cheng. Egnet: Edge guidance network for salient object detection. In Proceedings of the IEEE International Conference on Computer Vision, pp. 8779-8788, 2019.
Jianming Zhang and Stan Sclaroff. Saliency detection: A boolean map approach. In Proceedings of the IEEE international conference on computer vision, pp. 153-160, 2013.

(56) References Cited

OTHER PUBLICATIONS

Jianping Shi, Qiong Yan, Li Xu, and Jiaya Jia. Hierarchical image saliency detection on extended cssd. IEEE transactions on pattern analysis and machine intelligence, 38(4):717-729, 2015.
Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.
Jonathan Long, Evan Shelhamer, and Trevor Darrell. Fully convolutional networks for semantic segmentation. In Proceedings of the IEEE conference on computer vision and pattern recognition, pp. 3431-3440, 2015.
K. Maninis, S. Caelles, J. Pont-Tuset, and L. Van Gool. Deep extreme cut: From extreme points to object segmentation. In IEEE CVPR, 2018.
K. McGuinness and N. E. OConnor. Toward automated evaluation of interactive segmentation. Computer Vision and Image Understanding, 115(6):868-884, 2011.
K. Yamaguchi, M. H. Kiapour, L. E. Ortiz, and T. L. Berg. Parsing clothing in fashion photographs. In Computer Vision and Pattern Recognition (CVPR), 2012 IEEE Conference on, pp. 3570-3577. IEEE, 2012.
K. He, X. Zhang, S. Ren, and J. Sun. Deep residual learning for image recognition. In IEEE CVPR, Jun. 2016.
Kamat, S. P.; Control Theory and Informatics, vol. 2, No. 1, 2012 Digital Image Processing for Camera Application in Mobile Devices using Artificial Neural Networks, pp. 11-17.
Karen Simonyan and Andrew Zisserman. Very deep convolutional networks for large-scale image recognition. arXiv preprint arXiv:1409.1556, 2014.
L. Castrejon, K. Kundu, R. Urtasun, and S. Fidler. Annotating object instances with a polygon-rnn. In IEEE CVPR, Jul. 2017.
L. Grady. Random walks for image segmentation. Pattern Analysis and Machine Intelligence, IEEE Transactions on, 28(11): 1768-1783, 2006. Part 1.
L. Grady. Random walks for image segmentation. Pattern Analysis and Machine Intelligence, IEEE Transactions on, 28(11): 1768-1783, 2006. Part 2.
L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014.
L.-C. Chen, Y. Zhu, G. Papandreou, F. Schroff, and H. Adam. Encoder-decoder with atrous separable convolution for semantic image segmentation. arXiv preprint arXiv:1802.02611, 2018.
Laurent Itti, Christof Koch, and Ernst Niebur. A model of saliency-based visual attention for rapid scene analysis. IEEE Transactions on pattern analysis and machine intelligence, 20(11):1254-1259, 1998.
Le, T., & Duan, Y. (2020). REDN: a recursive encoder-decoder network for edge detection. IEEE Access, 8, 90153-90164. (Year: 2020).
Li et al., Interactive Image Segmentation with Latent Diversity, 2018, IEEE 2575-7075/18, DOI 10.11/09/CVPR. 2018.00067, pp. 577-585. (Year: 2018).
Lihe Zhang, Chuan Yang, Huchuan Lu, Xiang Ruan, and Ming-Hsuan Yang. Ranking saliency. IEEE transactions on pattern analysis and machine intelligence, 39(9): 1892-1904, 2016.
Lihe Zhang, Jianwu Ai, Bowen Jiang, Huchuan Lu, and Xiukui Li. Saliency detection via absorbing markov chain with learnt transition probability. IEEE Transactions on Image Processing, 27(2):987-998, 2017.
Lijun Wang, Huchuan Lu, Xiang Ruan, and Ming-Hsuan Yang. Deep networks for saliency detection via local estimation and global search. In Proceedings of the IEEE Conference on Computer Vision and Pattern Recognition, pp. 3183-3192, 2015.
Lijun Wang, Huchuan Lu, Yifan Wang, Mengyang Feng, Dong Wang, Baocai Yin, and Xiang Ruan. Learning to detect salient objects with image-level supervision. In Proceedings of the IEEE Conference on Computer Vision and Pattern Recognition, pp. 136-145, 2017.
Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.
Lu Zhang, Ju Dai, Huchuan Lu, You He, and Gang Wang. A bi-directional message passing model for salient object detection. In Proceedings of the IEEE Conference on Computer Vision and Pattern Recognition, pp. 1741-1750, 2018.
M. Everingham, L. Van Gool, C. K. Williams, J. Winn, and A. Zisserman. The pascal visual object classes (VOC) challenge. IJCV, 88(2):303-338, 2010.
M. Firman, N. D. F. Campbell, L. Agapito, and G. J. Brostow. Diversenet: When one right answer is not enough. In IEEE CVPR, Jun. 2018.
M. Kass, A. Witkin, and D. Terzopoulos. Snakes: Active contour models. IJCV, 1(4):321-331, 1988.
M. Rajchl et al., "DeepCut: Object Segmentation From Bounding Box Annotations Using Convolutional Neural Networks," in IEEE Transactions on Medical Imaging, vol. 36, No. 2, pp. 674-683, Feb. 2017, archived at arxiv.org/pdf/1605.07866.
Ming-Ming Cheng, Niloy J Mitra, Xiaolei Huang, Philip H S Torr, and Shi-Min Hu. Global contrast based salient region detection. IEEE transactions on pattern analysis and machine intelligence, 37(3):569-582, 2014.
N. Xu, B. Price, S. Cohen, J. Yang, and T. S. Huang. Deep interactive object selection. In IEEE CVPR, pp. 373-381, Mar. 13, 2016.
Nian Liu and Junwei Han. Dhsnet: Deep hierarchical saliency network for salient object detection. In Proceedings of the IEEE Conference on Computer Vision and Pattern Recognition, pp. 678-686, 2016.
Nian Liu, Junwei Han, and Ming-Hsuan Yang. Picanet: Learning pixel-wise contextual attention for saliency detection. In Proceedings of the IEEE Conference on Computer Vision and Pattern Recognition, pp. 3089-3098, 2018.
Ning Xu, Brian Price, Scott Cohen, and Thomas Huang. Deep image matting. In Proceedings of the IEEE Conference on Computer Vision and Pattern Recognition, pp. 2970-2979, 2017.
Notice of Grant as received in Australian application 2019250107 dated Mar. 17, 2022.
Notice of Grant as received in UK application GB1813276.1 dated Oct. 12, 2021.
O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. IJCV, 115(3):211-252, 2015.
Office Action as received in CN application 201810886944.1 dated Apr. 8, 2023.
Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.
Philipp Krahenbuhl and Vladlen Koltun. Efficient inference in fully connected crfs with gaussian edge potentials. In Advances in neural information processing systems, pp. 109-117, 2011.
Pingping Zhang, Dong Wang, Huchuan Lu, Hongyu Wang, and Xiang Ruan. Amulet: Aggregating multi-level convolutional features for salient object detection. In Proceedings of the IEEE International Conference on Computer Vision, pp. 202-211, 2017.
R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.
Robert Osserman et al. The isoperimetric inequality. Bulletin of the American Mathematical Society, 84(6):1182-1238, 1978.
Roth, H.—"DeepOrgan: Multi-level Deep Convolutional Networks for Automated Pancreas Segmentation"—Jun. 22, 2015—arXiv: 1506.06448v1, pp. 1-12.

(56) References Cited

OTHER PUBLICATIONS

Rui Zhao, Wanli Ouyang, Hongsheng Li, and Xiaogang Wang. Saliency detection by multi-context deep learning. In Proceedings of the IEEE conference on computer vision and pattern recognition, pp. 1265-1274, 2015.
S. Lee, S. Purushwalkam Shiva Prakash, M. Cogswell, D. Crandall, and D. Batra. Why M heads are better than one: Training a diverse ensemble of deep networks. CoRR, abs/1511.06314, 2015.
S. Lee, S. Purushwalkam Shiva Prakash, M. Cogswell, V. Ranjan, D. Crandall, and D. Batra. Stochastic multiple choice learning for training diverse deep ensembles. In D. D. Lee, M. Sugiyama, U. V. Luxburg, I. Guyon, and R. Garnett, editors, NIPS, pp. 2119-2127. 2016.
S. Mahadevan, P. Voigtlaender, and B. Leibe. Iteratively trained interactive segmentation. arXiv preprint arXiv:1805.04398, 2018.
S. Ren, K. He, R. Girshick, and J. Sun. Faster r-cnn: Towards real-time object detection with region proposal networks. In Advances in neural information processing systems, pp. 91-99, 2015.
S. Vicente, V. Kolmogorov, and C. Rother. Graph cut based image segmentation with connectivity priors. In IEEE CVPR, pp. 1-8. IEEE, 2008.
S. Zheng, S. Jayasumana, B. Romera-Paredes, V. Vineet, Z. Su, D. Du, C. Huang, and P. Torr. Conditional random fields as recurrent neural networks. arXiv preprint arXiv:1502.03240, 2015.
Shuai Zheng, Sadeep Jayasumana, Bernardino Romera-Paredes, Vibhav Vineet, Zhizhong Su, Dalong Du, Chang Huang, and Philip HS Torr. Conditional random fields as recurrent neural networks. In Proceedings of the IEEE international conference on computer vision, pp. 1529-1537, 2015..
Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405.0312v3 [cs.CV], 15 pages.
V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.
Wang, G.—"Interactive Medical Image Segmentation using Deep Learning with Image-specific Fine-tuning"—arXiv—Oct. 11, 2017— pp. 1-11 (Year: 2017).
Wang, N.—"Transferring Rich Feature Hierarchies for Robust Visual Tracking"—Apr. 23, 2015—arXiv:1501.04587v2, pp. 1-9.
Wang, Y., Zhao, X., Li, Y., & Huang, K. (2018). Deep crisp boundaries: From boundaries to higher-level tasks. IEEE Transactions on Image Processing, 28(3), 1285-1298. (Year: 2018).
Wangjiang Zhu, Shuang Liang, Yichen Wei, and Jian Sun. Saliency optimization from robust background detection. In Proceedings of the IEEE conference on computer vision and pattern recognition, pp. 2814-2821, 2014.
X. Bai and G. Sapiro. Geodesic matting: A framework for fast interactive image and video segmentation and matting. International Journal of Computer Vision, 82(2):113-132, 2008.
Xiang Li, Tianhan Wei, Yau Pun Chen, Yu-Wing Tai, and Chi-Keung Tang. Fss-1000: A 1000-class dataset for few-shot segmentation. In Proceedings of the IEEE/CVF Conference on Computer Vision and Pattern Recognition, pp. 2869-2878, 2020.
Xiaoning Zhang, Tiantian Wang, Jinqing Qi, Huchuan Lu, and Gang Wang. Progressive attention guided recurrent network for salient object detection. In Proceedings of the IEEE Conference on Computer Vision and Pattern Recognition, pp. 714-722, 2018.
Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.
Xu et al., Deep Interactive Object Selection, Mar. 13, 2016 arXiv:1603.04042v1 [cs.CV], pp. 1-9. (Year: 2016).
Y. Hu, A. Soltoggio, R. Lock, and S. Carter. A fully convolutional two-stream fusion network for interactive image segmentation. Neural Networks, 109:31-42, 2019.
Y. Li, J. Sun, C.-K. Tang, and H.-Y. Shum. Lazy snapping. In ACM Transactions on Graphics, vol. 23, pp. 303-308, 2004.
Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.
Yi Zeng, Pingping Zhang, Jianming Zhang, Zhe Lin, and Huchuan Lu. Towards high-resolution salient object detection. In Proceedings of the IEEE International Conference on Computer Vision, pp. 7234-7243, 2019.
Yichen Wei, Fang Wen, Wangjiang Zhu, and Jian Sun. Geodesic saliency using background priors. In European conference on computer vision, pp. 29-42. Springer, 2012.
Youwei Pang, Xiaoqi Zhao, Lihe Zhang, and Huchuan Lu. Multi-scale interactive network for salient object detection. In Proceedings of the IEEE/CVF Conference on Computer Vision and Pattern Recognition, pp. 9413-9422, 2020.
Z. Li, Q. Chen, and V. Koltun. Interactive image segmentation with latent diversity. In IEEE CVPR, pp. 577-585, 2018.
Z. Liu, X. Li, P. Luo, C. C. Loy, and X. Tang. Semantic image segmentation via deep parsing network. arXiv preprint arXiv:1509.02634, 2015.
Zhang et al. in U.S. Appl. No. 16/988,055, filed Aug. 7, 2020, entitled Generating an Image Mask for a Digital Image By Utilizing a Multi-Branch Masking Pipeline With Neural Networks.
Zhiming Luo, Akshaya Mishra, Andrew Achkar, Justin Eichel, Shaozi Li, and Pierre-Marc Jodoin. Non-local deep features for salient object detection. In Proceedings of the IEEE Conference on computer vision and pattern recognition, pp. 6609-6617, 2017.
U.S. Appl. No. 14/945,245, filed Sep. 21, 2017, Preinterview 1st Office Action.
U.S. Appl. No. 14/945,245, filed Nov. 1, 2017, 1st Action Office Action.
U.S. Appl. No. 14/945,245, filed Apr. 17, 2018, Office Action.
U.S. Appl. No. 14/945,245, filed Sep. 12, 2018, Notice of Allowance.
U.S. Appl. No. 16/216,739, filed Feb. 25, 2021, Preinterview 1st Office Action.
U.S. Appl. No. 16/216,739, filed Apr. 5, 2021, 1st Action Office Action.
U.S. Appl. No. 16/216,739, filed Sep. 13, 2021, Office Action.
U.S. Appl. No. 16/216,739, filed Dec. 23, 2021, Notice of Allowance.
U.S. Appl. No. 15/799,395, filed Mar. 14, 2019, Office Action.
U.S. Appl. No. 15/799,395, filed Jul. 12, 2019, Notice of Allowance.
U.S. Appl. No. 15/967,928, filed Dec. 10, 2020, Preinterview 1st Office Action.
U.S. Appl. No. 15/967,928, filed Apr. 2, 2021, 1st Action Office Action.
U.S. Appl. No. 15/967,928, filed May 13, 2021, Office Action.
U.S. Appl. No. 15/967,928, filed Sep. 29, 2021, Notice of Allowance.
U.S. Appl. No. 16/231,746, filed Feb. 18, 2021, Preinterview 1st Office Action.
U.S. Appl. No. 16/231,746, filed Jun. 11, 2021, 1st Action Office Action.
U.s. Appl. No. 16/231,746, filed Nov. 10, 2021, Notice of Allowance.
U.S. Appl. No. 16/988,408, Oct. 5, 2021, Preinterview 1st Office Action.
U.S. Appl. No. 16/988,408, filed Nov. 24, 2021, 1st Office Action.
U.S. Appl. No. 16/988,408, filed Jan. 5, 2022, Notice of Allowance.
U.S. Appl. No. 16/376,704, filed Dec. 29, 2021, Preinterview 1st Office Action.
U.S. Appl. No. 16/376,704, filed Feb. 7, 2022, 1st Action Office Action.
U.S. Appl. No. 16/376,704, filed Jun. 14, 2022, Office Action.
U.S. Appl. No. 16/376,704, filed Oct. 4, 2022, Notice of Allowance.

(56) References Cited

OTHER PUBLICATIONS

U.S. Appl. No. 17/126,986, filed Aug. 30, 2022, Office Action.
U.S. Appl. No. 17/126,986, filed Jan. 17, 2023, Notice of Allowance.
U.S. Appl. No. 17/660,361, filed Dec. 8, 2022, Office Action.
U.S. Appl. No. 17/660,361, filed Mar. 28, 2023 Notice of Allowance.
U.S. Appl. No. 17/200,525, filed Mar. 6, 2023, Office Action.
U.S. Appl. No. 17/584,233, Apr. 11, 2024, Office Action.

* cited by examiner

UPSAMPLING AND REFINING SEGMENTATION MASKS

CROSS REFERENCE TO RELATED APPLICATIONS

This application claims the benefit of and priority to U.S. Provisional Patent Application No. 63/271,149, filed Oct. 23, 2021, which is incorporated herein by reference in its entirety.

BACKGROUND

Recent years have seen a significant advancement in hardware and software platforms for editing digital visual media items (e.g., digital photos, digital videos, digital video feeds). Indeed, as devices capable of generating and displaying/sharing digital visual media have become more prevalent, so have systems for enhancing digital visual media items using various digital editing techniques. For example, many conventional systems generate a segmentation mask to distinguish between various portions of a digital visual media item (e.g., distinguish a displayed object from a background). Many such conventional systems use segmentation masks to apply various filters or effects to a desired portion of the digital visual media item. Although conventional segmentation systems generate segmentation masks for digital visual media items, such systems are often inflexibly limited to low-resolutions, are often inaccurate at segmenting fine-grained details in high-resolution images, and often require extensive memory and computing resources to process high-resolution images.

BRIEF SUMMARY

One or more embodiments described herein provide benefits and/or solve one or more problems in the art with systems, methods, and non-transitory computer-readable media that flexibly generate accurate, refined segmentation masks for high-resolution digital images via segmentation with guided upsampling, selective patch-based refinement, and mask fusion. For example, in one or more embodiments, the system utilizes a segmentation refinement neural network to upsample and refine a preliminary segmentation mask utilizing a patch-based approach. The system then fuses the patch-based refined segmentation mask with an upsampled version of the preliminary segmentation mask. By fusing the patch-based refined segmentation mask with the upsampled preliminary segmentation mask, the system maintains a global perspective and helps avoid artifacts due to the local patch-based refinement process. In this manner, the system flexibly adapts image segmentation to generate accurate high-resolution segmentation masks. Furthermore, the system allows for generation of a segmentation mask of an arbitrary higher resolution from a lower resolution segmentation mask.

The following description sets forth additional features and advantages of one or more implementations of the disclosed systems, computer-readable media, and methods.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
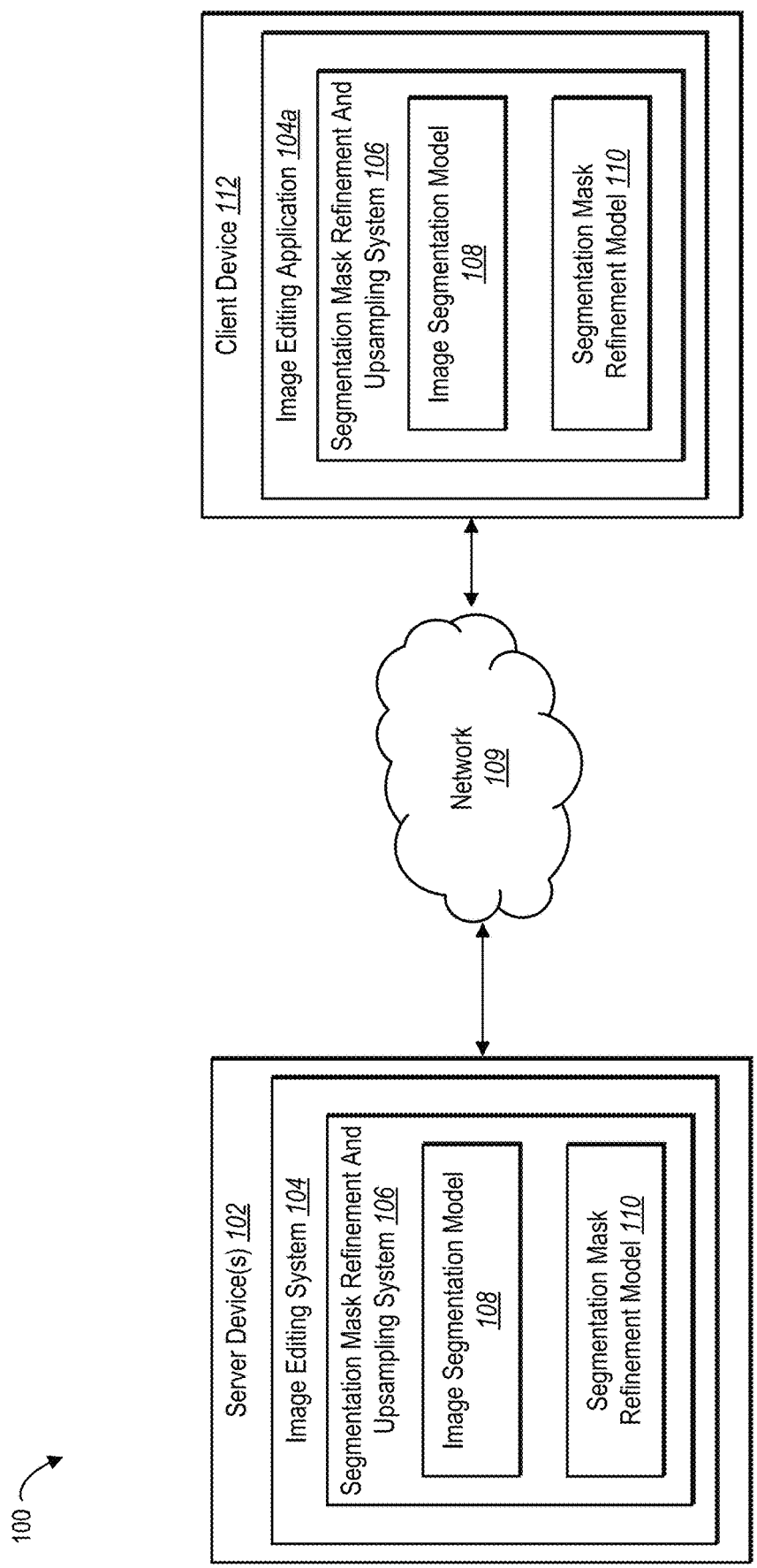
FIG. 1 illustrates an example environment in which a segmentation mask refinement and upsampling system operates in accordance with one or more embodiments.

One or more embodiments include a segmentation mask refinement and upsampling system that flexibly generates accurate, refined segmentation masks for high-resolution digital images via segmentation with guided upsampling, selective patch-based refinement, and mask fusion. For example, in one or more embodiments, the segmentation mask refinement and upsampling system refines and upsamples a preliminary segmentation mask utilizing a patch-based refinement process to generate a patch-based refined segmentation mask. The segmentation mask refinement and upsampling system then fuses the patch-based refined segmentation mask with an upsampled version of the preliminary segmentation mask. By fusing the patch-based refined segmentation mask with the upsampled preliminary segmentation mask, the segmentation mask refinement and upsampling system maintains a global perspective and helps avoid artifacts due to the local patch-based refinement process. In this manner, the segmentation mask refinement and upsampling system flexibly adapts image segmentation to generate accurate high-resolution segmentation masks.

More specifically, the segmentation mask refinement and upsampling system utilizes a segmentation refinement neural network that includes a recursive decoder for flexible segmentation mask upsampling and refinement. Indeed, in one or more embodiments, the segmentation mask refinement and upsampling system generates a patch-based refined segmentation mask for a digital image (or other digital image) from a preliminary segmentation mask utilizing the segmentation refinement neural network. In particular, in some cases, the recursive decoder utilizes a patch-based processes to iteratively improve the quality of segmentation masks in higher resolutions. In some instances, the segmentation refinement neural network utilizes a preliminary segmentation mask with lower resolution and a higher resolution digital image from which the preliminary segmentation mask was generated and recovers/refines details while upsampling to an original or otherwise higher resolution.

To provide an illustration, in one or more embodiments, the segmentation mask refinement and upsampling system generates, utilizing a segmentation refinement neural network, a patch-based refined segmentation mask for a digital image depicting one or more objects. For example, in some implementations, the segmentation mask refinement and upsampling system utilizes a segmentation refinement neural network having an encoder-decoder network architecture. To illustrate, in some instances, the segmentation refinement neural network includes an encoder and a recursive decoder. Accordingly, the segmentation mask refinement and upsampling system utilizes the encoder to generate various encoded feature maps corresponding to the digital image and utilizes the recursive decoder to generate the patch-based refined segmentation mask based on the encoded feature maps.

In some implementations, the recursive decoder includes a deconvolution branch and a refinement branch. In some cases, the segmentation mask refinement and upsampling system utilizes the deconvolution branch to generate one or more decoded feature maps corresponding to the digital image based on the encoded feature maps. Further, the segmentation mask refinement and upsampling system utilizes the refinement branch to generate a patch-based refined segmentation mask for the digital image based on the decoded feature maps and the encoded feature maps. For example, in some implementations, the segmentation mask refinement and upsampling system receives a preliminary segmentation mask and recursively refines the initial segmentation mask using the refinement branch.

In some implementations, the segmentation mask refinement and upsampling system utilizes the recursive decoder to generate an uncertainty map that identifies pixels having an associated uncertainty whether or not the pixels correspond to the object of the segmentation mask to be refined. In such embodiments, the segmentation mask refinement and upsampling system utilizes a local patch-based approach to refine the preliminary segmentation mask based on the respective uncertainty map by refining the uncertain patches of the segmentation mask. The uncertainty map provides guidance to the areas of a segmentation mask to be refined. Thus, by utilizing the uncertainty map, the segmentation mask refinement and upsampling system limits computational costs by avoiding the refinement of every pixel/location of a segmentation map.

In one or more implementations, the segmentation mask refinement and upsampling system fuses the patch-based refined segmentation mask output by the segmentation refinement neural network with an upsampled version of the preliminary segmentation mask. By fusing the patch-based refined segmentation mask with the upsampled preliminary segmentation mask, the segmentation mask refinement and upsampling system maintains a global perspective and helps avoid artifacts due to the local patch-based refinement process.

More specifically, the segmentation mask refinement and upsampling system fuses the upsampled preliminary segmentation mask and the patch-based refined segmentation mask to generate an upsampled and refined segmentation mask. To fuse the upsampled preliminary segmentation mask and the patch-based refined segmentation mask, the segmentation mask refinement and upsampling system, in one or more embodiments, performs a thresholding operation to binarize each pixel location as being part of the object being segmented or not part of the object being segmented. To do so, the segmentation mask refinement and upsampling system bases the thresholding off of a combination of the upsampled preliminary segmentation mask and the patch-based refined segmentation mask. For example, in some implementations, interior portions of the segmentation mask may be better informed by the upsampled preliminary segmentation mask and border portions may be better informed by the patch-based refined segmentation mask. As such, the segmentation mask refinement and upsampling system weights which confidence values to base the thresholding operation (or how to combine the confidence values) from the upsampled preliminary segmentation mask and the patch-based refined segmentation mask.

In one or more embodiments, the segmentation mask refinement and upsampling system utilizes the upsampled and refined segmentation mask to modify the digital image. For example, in some implementations, the segmentation mask refinement and upsampling system applies a filter or a digital effect to the digital image based on the upsampled and refined segmentation mask. In alternative implementations, the segmentation mask refinement and upsampling system utilizes the upsampled and refined segmentation mask to generate a composite digital image that combines one or more objects segmented by the upsampled and refined segmentation mask with another digital image.

As mentioned above, conventional segmentation systems suffer from several technological shortcomings that result in inflexible and inaccurate operation. For example, many conventional segmentation systems are rigidly limited to segmenting the foregrounds of low-resolution digital images (e.g., digital images having a resolution below 2K). Indeed, conventional segmentation systems typically implement segmentation models that focus on low-resolution digital images where fine-grained details constituting object boundaries are not well represented due to the insufficient number of pixels. Accordingly, such details are often rigidly ignored (e.g., not accounted for) by the implemented models, and the conventional systems fail to flexibly adapt to digital images having a relatively higher resolution (e.g., a resolution between 2K and 4K) where such details are better represented.

Further, conventional segmentation systems also operate inaccurately. In particular, because conventional systems typically implement models that are not designed to perform segmentation of high-resolution fine-grained details, such systems often fail to generate accurate segmentation masks for high-resolution images including such fine-grained details. For example, as the resolution of a digital image increases, the higher number of pixels reveals the finer details of hard-to-see, complex object boundaries, such as those associated with animal fur, human hairs, insect antennae, flower stamens, cavities inside jewelry, etc. As the segmentation models implemented by conventional systems typically fail to account for finer details, these systems often fail to generate segmentation masks that accurately capture the boundaries of such objects.

The segmentation mask refinement and upsampling system provides several advantages over conventional systems. For example, the segmentation mask refinement and upsampling system operates more flexibly than conventional systems. In particular, the segmentation mask refinement and upsampling system flexibly adapts to generate upsampled and refined segmentation masks for high-resolution digital images (e.g., digital images having a resolution between 2K and 4K). For example, by utilizing a recursive decoder that includes a deconvolution branch and a refinement branch, the segmentation mask refinement and upsampling system flexibly improves upon the level of detail represented in segmentation masks generated for digital images. Indeed, the segmentation mask refinement and upsampling system generates upsampled and refined segmentation masks having a high resolution (e.g., the original resolution associated with the digital image) from initial low-resolution segmentation masks.

Additionally, the segmentation mask refinement and upsampling system improves the accuracy of segmentation masks generated for digital images—particularly those digital images having a high resolution. Indeed, by improving the level of detail represented within generated segmentation masks, the segmentation mask refinement and upsampling system generates segmentation masks (e.g., upsampled and refined segmentation masks) that more accurately distinguish an object portrayed in a digital image from a background. Accordingly, the segmentation mask refinement and upsampling system generates more accurate segmentation masks for high-resolution digital images where fine-grained details associated with complex object boundaries are more apparent.

Furthermore, the segmentation mask refinement and upsampling system avoids artifacts that patch-based refinement processes may introduce by fusing the patch-based refined segmentation mask with the upsampled preliminary object mask. As mentioned previously, this fusion process helps maintain a global perspective that the patch-based refinement process tends to lose. Thus, the segmentation mask refinement and upsampling system improves the accuracy of state-of-the-art patch-based refinement and upsampling systems.

Additional detail regarding the segmentation mask refinement and upsampling system will now be provided with reference to the figures. For example, FIG. 1 illustrates a schematic diagram of an exemplary system environment 100 in which a segmentation mask refinement and upsampling system operate in one or more implementations. As illustrated in FIG. 1, the system 100 includes a server device(s) 102, a network 109, and client device 112.

Although the system 100 of FIG. 1 is depicted as having a particular number of components, the system 100 can have any number of additional or alternative components (e.g., any number of servers, client devices, or other components in communication with the segmentation mask refinement and upsampling system 106 via the network 109). Similarly, although FIG. 1 illustrates a particular arrangement of the server device(s) 102, the network 109, and the client device 112, various additional arrangements are possible.

The server device(s) 102, the network 109, and the client device 112 are communicatively coupled with each other either directly or indirectly (e.g., through the network 109 discussed in greater detail below in relation to FIG. 11). Moreover, the server device(s) 102 and the client device 112 include computing devices such as those discussed in greater detail with relation to FIG. 11.

As mentioned above, the system 100 includes the server device(s) 102. In one or more implementations, the server device(s) 102 generates, stores, receives, and/or transmits data including digital visual media items, segmentation masks, and modified digital visual media items. For example, in some implementations, the server device(s) 102 receives a digital visual media item from a client device 112 and transmits a segmentation mask or modified digital visual media item to the client device. In one or more implementations, the server device(s) 102 comprises a data server. In some implementations, the server device(s) 102 comprises a communication server or a web-hosting server.

As shown in FIG. 1, the server device(s) 102 includes an image editing system 104. In one or more implementations, the image editing system 104 provides functionality by which a user (e.g., a user of one of the client device 112) generates, edits, manages, and/or stores digital visual media items. For example, in some instances, a user utilizes a client device to send a digital visual media item to the image editing system 104 hosted on the server device(s) 102 via the network 109. The image editing system 104 then provides options that the user may use to edit the digital visual media item, store the digital visual media item, and subsequently search for, access, and view the digital visual media item.

Additionally, the server device(s) 102 include the segmentation mask refinement and upsampling system 106, which in turn includes the image segmentation model 108 and the segmentation mask refinement model 110. In particular, in one or more implementations, the segmentation mask refinement and upsampling system 106 utilizes the server device(s) 102 to generate object masks for digital visual media items. For example, the segmentation mask refinement and upsampling system 106 utilizes the server device(s) 102 to identify a digital visual media item and generate preliminary object masks and upsampled and refined segmentation masks for objects in a digital image or other digital visual media item.

In one or more implementations, the client device 112 include computing devices that are able to access, edit, store, and/or provide, for display, digital visual media items. For example, the client device 112 includes smartphones, tablets, desktop computers, laptop computers, head-mounted-display devices, or other electronic devices. The client device 112 include one or more applications (e.g., the image editing application 104a) that accesses, edits, segments, modifies, stores, and/or provides, for display, digital visual media items. For example, in one or more implementations, the image editing application 104a includes a software application installed on the client device 112. Additionally, or alternatively, the image editing application 104a includes a software application hosted on the server device(s) 102 (and supported by the image editing system 104 on the server), which may be accessed by the client device 112 through another application, such as a web browser.

In particular, in some implementations, the segmentation mask refinement and upsampling system 106 on the server device(s) 102 supports the segmentation mask refinement and upsampling system 106 on the client device 112. For instance, the segmentation mask refinement and upsampling system 106 learns parameters for the various neural networks and machine learning models. The digital content editing system 106 then provides the neural networks and machine learning models to the client device 112. In other words, the client device 112 obtains (e.g., downloads) the neural networks and machine learning models with the learned parameters from the server device(s) 102. Once downloaded, the segmentation mask refinement and upsampling system 106 on the client device 112 utilizes the neural networks and machine learning models to generate preliminary segmentation masks and upsampled and refined segmentation masks independent from the server device(s) 102.

In alternative implementations, the segmentation mask refinement and upsampling system 106 includes a web hosting application that allows the client device 112 to interact with content and services hosted on the server device(s) 102. To illustrate, in one or more implementations, the client device 112 accesses a web page via the supported by the server device(s) 102. For example, the client device 112 provides a digital image to the server device(s) 102, and, in response, the segmentation mask refinement and upsampling system 106 on the server device(s) 102 generates an upsampled and refined segmentation mask. The server device(s) 102 then provides the upsampled and refined segmentation mask to the client device 112 for display or editing of the digital image.

In still further implementations, the client devices 112 utilizes one or more machine learning models or neural networks of the segmentation mask refinement and upsampling system 106 to generate preliminary segmentation masks of objects in a digital image. The server device(s) 102 on the other hand utilize one or more machine learning models or neural networks of the segmentation mask refinement and upsampling system 106 to generate upsampled and refined object masks from the preliminary object mask. Thus, the functionality of the segmentation mask refinement and upsampling system 106 is deployable by the server device(s) 102, the client device 112, or a combination thereof.

Indeed, the segmentation mask refinement and upsampling system 106 is able to be implemented in whole, or in part, by the individual elements of the system 100. Indeed, although FIG. 1 illustrates the segmentation mask refinement and upsampling system 106 implemented with regard to the server device(s) 102, different components of the segmentation mask refinement and upsampling system 106 can be implemented by a variety of devices within the system 100. For example, one or more (or all) components of the segmentation mask refinement and upsampling system 106 are be implemented by a different computing device (e.g., one of the client device 112) or a separate server from the server device(s) 102 hosting the image editing system 104.

Figure 2:
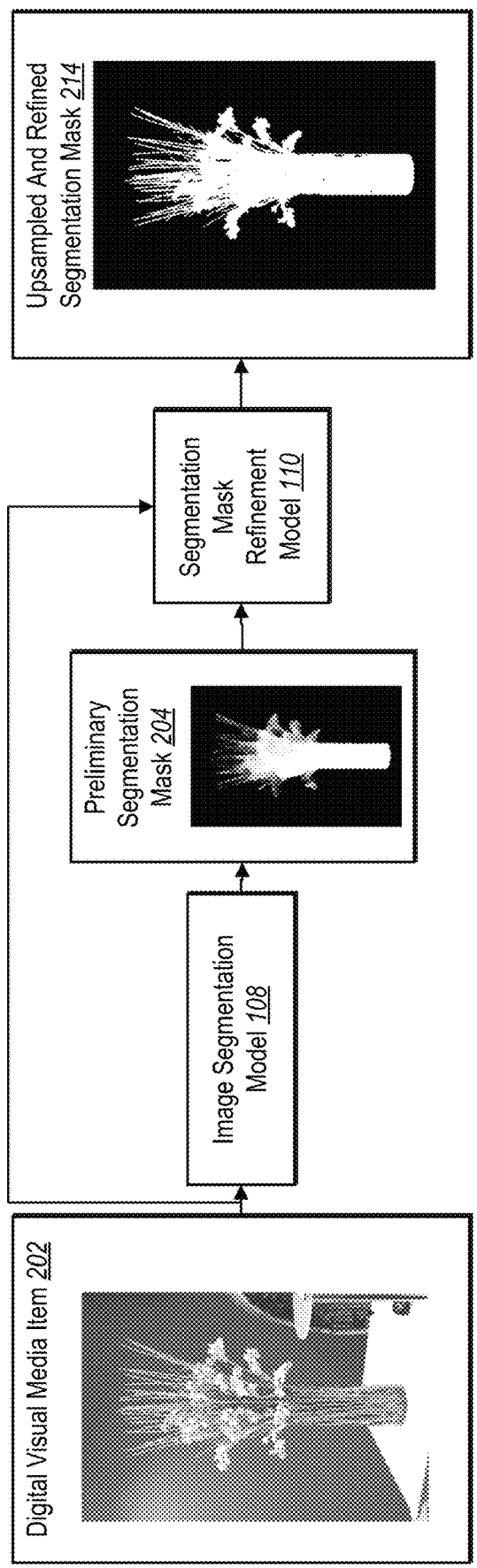
FIG. 2 illustrates an overview diagram of the segmentation mask refinement and upsampling system generating an upsampled and refined segmentation mask from a preliminary segmentation mask in accordance with one or more embodiments.

FIG. 2 illustrates an overview diagram of the segmentation mask refinement and upsampling system 106 generating one or more segmentation masks of one or more objects in a digital visual media item 202. In one or more implementations, a digital visual media item includes any digital item capable of producing a visual representation. In particular, in some implementations, a digital visual media item includes a digital item, such as a digital image (e.g., a digital photo or other digitally-created image) or digital video. In some implementations, a digital visual media item includes to a digital video or other camera feed. Further, in some instances, a digital video media item includes a video frame of a previously-captured digital video or a video frame of a digital video feed.

In one or more implementations, a digital visual media item depicts one or more objects (e.g., as shown by the digital visual media item 202). In one or more implementations, an object includes a distinguishable element depicted in a digital visual media item. For example, in some implementations, an object includes a person, an item, a natural object (e.g., a tree or rock formation) or a structure depicted in a digital visual media item. In some instances, an object includes a plurality of elements that, collectively, can be distinguished from other elements depicted in a digital visual media item. For example, in some instances, an object includes a collection of buildings that make up a skyline. In some instances, an object more broadly includes a foreground or other element(s) depicted in a digital visual media item as distinguished from a background. For example, the digital visual media item 202 has objects including a vase with flowers, a table, a computer mouse, a chair, a wall in the background, a stand, and a chair back.

In one or more implementations, the segmentation mask refinement and upsampling system 106 determines (e.g., identifies) the digital visual media item 202 by receiving the digital visual media item 202 from a computing device (e.g., a third-party system or a client device) or receiving user input identifying the digital visual media item 202 for segmentation masking In some implementations, however, the segmentation mask refinement and upsampling system 106 determines the digital visual media item 202 by accessing a database storing digital visual media items. For example, in at least one implementation, the segmentation mask refinement and upsampling system 106 maintains a database and stores a plurality of digital visual media items therein. In some instances, an external device or system stores digital visual media items for access by the segmentation mask refinement and upsampling system 106.

As discussed above, the segmentation mask refinement and upsampling system 106 operates on a computing device (e.g., the server device(s) 102 or client device 112, such as smart phone or tablet). Accordingly, in some implementations, the segmentation mask refinement and upsampling system 106 identifies the digital visual media item 202 by accessing the digital visual media item 202 from local storage, detecting that the computing device has captured the digital visual media item 202, or by determining that the computing device has activated a camera to capture the digital visual media item 202 (e.g., is capturing a digital video feed or is setup to capture a digital photo).

As shown by FIG. 2, the segmentation mask refinement and upsampling system 106 optionally utilizes an image segmentation model 108 to generate preliminary segmentation mask 204 for an object (e.g., the vase of flowers) in the digital visual media item 202. Also, the segmentation mask refinement and upsampling system 106 then utilizes a segmentation mask refinement model 110 to generate an upsampled and refined segmentation mask 214 in accordance with one or more implementations. Both the image segmentation model 108 and the segmentation mask refinement model 110 comprise machine learning models. For example, in one or more implementations, as explained in greater detail below, each of the image segmentation model 108 and the segmentation mask refinement model 110 comprise a neural network configured to generate or refine segmentation masks. In particular, in one or more implementations, the image segmentation model 108 includes a panoptic segmentation neural network and the segmentation mask refinement model 110 includes a segmentation refinement neural network.

Generally, in one or more implementations, a neural network includes a machine learning model that can be tuned (e.g., trained) based on inputs to approximate unknown functions used for generating the corresponding outputs. Indeed, in some implementations, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some implementations, a neural network includes a convolutional neural network, a recurrent neural network (e.g., a long short-term memory neural network), a generative adversarial neural network, a graph neural network, or a multi-layer perceptron. In some implementations, a neural network includes a combination of neural networks or neural network components.

More particularly, in one or more implementations, a neural network includes a computer-implemented neural network that generates and/or refines segmentation masks for digital visual media items. Indeed, in some implementations, a panoptic segmentation neural network analyzes a digital visual media item to identify and mask object instances in a digital visual media item. A segmentation refinement neural network generates one or more refined objects masks based on the a preliminary segmentation mask and the digital visual media item. For example, in one or more implementations, a neural network is composed of an encoder-decoder network architecture. For instance, in some implementations, the panoptic segmentation neural network includes an encoder, one or more object detection heads, and one or more segmentation masking heads. Similarly, the segmentation refinement neural network, in one or more implementations, includes an encoder and a recursive or iterative decoder. In some cases, the recursive decoder includes a deconvolution branch and a refinement branch. Example architectures of the panoptic segmentation neural network and the refinement neural network will be discussed in more detail below.

As mentioned, FIG. 2 illustrates an overview of the segmentation mask refinement and upsampling system 106 optionally generates a preliminary segmentation mask 204 for an object and a corresponding upsampled and refined segmentation mask 214. In one or more implementations, a segmentation mask generally includes an identification of pixels in a digital visual media item that represent an object. In particular, in some implementations, a segmentation mask includes a filter useful for partitioning a digital visual media item into separate portions. For example, in some cases, a segmentation mask includes a filter that corresponds to a digital visual media item and identifies a portion of the digital visual media item (i.e., pixels of the digital visual media item) belonging to one or more objects and a portion of the digital visual media item belonging to a background or other objects. For example, in some implementations, a segmentation mask includes a map of a digital visual media item that has an indication for each pixel of whether the pixel corresponds to part of an object or not. In some implementations, the indication includes a binary indication (a 1 for pixels belonging to the object and a zero for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

Relatedly, in one or more implementations a preliminary segmentation mask includes a segmentation mask generated directly from a corresponding digital visual media item. For example, in some implementations an initial segmentation mask includes a first segmentation mask generated by an image segmentation model based on a digital visual media item. In one or more implementations, a preliminary segmentation mask has a lower resolution or is otherwise less accurate or refined than an upsampled and refined segmentation mask. Furthermore, in one or more implementations, the segmentation mask refinement and upsampling system 106 utilizes less time and/or processing power to generate a preliminary segmentation mask compared to a corresponding upsampled and refined segmentation mask. In one or more implementations, the preliminary segmentation mask includes a segmentation mask that corresponds to the digital image but has a resolution that is lower than the resolution of the digital image (e.g., the original resolution). For example, in some implementations, the preliminary segmentation mask includes the same resolution as a low-resolution copy of the digital image. In some cases, the preliminary segmentation mask includes a resolution that is between the resolution of a low-resolution copy of the digital image and the original resolution associated with the digital image.

Also, in one or more implementations, an upsampled and refined segmentation mask includes a segmentation mask generated based on another segmentation mask, such as a preliminary segmentation mask or another segmentation mask. In particular, in some instances, an upsampled and refined segmentation mask includes a segmentation mask having pixels that have been re-analyzed or re-classified to indicate whether or not those pixels belong to an object portrayed in the digital visual media item. For example, in some implementations, an upsampled and refined segmentation mask includes a segmentation mask having one or more pixels that were indicated, in a previous segmentation mask, as being uncertain as to whether or not they belong to an object but have since been determined to belong or not belong to an object with a greater certainty. In one or more implementations, an upsampled and refined segmentation mask has a higher resolution than a preliminary segmentation mask from which the refined segmentation mask is generated. In one or more implementations, an upsampled and refined segmentation mask has the same resolution as a digital visual media item from which the preliminary segmentation mask and the upsampled and refined segmentation mask are generated. Furthermore, in one or more implementations, the segmentation mask refinement and upsampling system 106 utilizes more time and/or processing power to generate an upsampled and refined segmentation mask compared to a corresponding preliminary segmentation mask.

To generate the preliminary segmentation mask 204 for the objects in the digital visual media item 202, in one or more implementations, the segmentation mask refinement and upsampling system 106 utilizes a lower resolution version of the digital visual media item 202. For example, the segmentation mask refinement and upsampling system 106 down samples the digital visual media item 202 to a reduced image size. Alternatively, the segmentation mask refinement and upsampling system 106 accesses a lower-resolution copy of the digital visual media item 202.

In one or more implementations, a resolution includes a number of pixels. In particular, in some implementations, a resolution includes the number of pixels depicted in a digital image or a corresponding segmentation mask. In one or more implementations, a relatively higher resolution corresponds to a relatively greater degree of detail reflected in the digital image or segmentation mask, especially with regard to fine or complex details (e.g., hair, fur, textures, etc.). In some implementations, a high resolution includes a resolution at 2K (e.g., 2560×1440 pixels) or above. Accordingly, in some cases, a low resolution includes a resolution below 2K. It should be understood, however, that in many instances, the terms "low" and "high" are relative so that a high resolution includes a resolution having a greater number of pixels than another resolution and, similarly, a low resolution includes a resolution having a lower number of pixels than another resolution. To illustrate, in one or more implementations, the digital image includes a resolution at or above 2K, and the segmentation mask refinement and upsampling system 106 generates a low-resolution copy of the digital image by generating a digital copy of the digital image having a resolution below 2K.

As indicated, a resolution corresponds to a number of pixels. In one or more implementations, a pixel includes a unit of a digital image or a segmentation mask. In particular, in some implementations, a pixel includes the smallest distinguishable element of a digital image or a segmentation mask. Indeed, as suggested above, in some cases, a digital image or a segmentation mask includes a plurality of pixels that collectively correspond to one or more portions of the digital image or the segmentation mask, respectively.

In one or more implementations, the segmentation mask refinement and upsampling system 106 utilizes the image segmentation model 108 to generate a preliminary segmentation mask 204 from a low-resolution copy of the digital visual media item 202. In one or more implementations the image segmentation model 108 comprises a neural network. For example, in one or more implementations, the image segmentation model 108 comprises an object detection and segmentation masking neural network or DOMO as described in previously incorporated U.S. Provisional Patent Application No. 63/271,149. In alternative implementations, the image segmentation model 108 comprises a panoptic segmentation neural network as described in U.S. patent application Ser. No. 17/319,979, filed on May 13, 2021 and entitled "GENERATING IMPROVED PANOPTIC SEGMENTED DIGITAL IMAGES BASED ON PANOPTIC SEGMENTATION NEURAL NETWORKS THAT UTILIZE EXEMPLAR UNKNOWN OBJECT CLASSES," the entire contents of which are hereby incorporated by reference. In still further implementations, the image segmentation model 108 comprises a class-agnostic object segmentation neural network as described in U.S. patent application Ser. No. 17/151,111, filed on Jan. 15, 2021 and entitled "GENERATING CLASS-AGNOSTIC SEGMENTATION MASKS IN DIGITAL IMAGES," the entire contents of which are hereby incorporated by reference.

In any event, the segmentation mask refinement and upsampling system 106 utilizes the image segmentation model 108 to generate a preliminary segmentation mask 204 for an object in the digital visual media item 202. In alternative implementations, the segmentation mask refinement and upsampling system 106 obtains or access the preliminary segmentation mask 204 without generating the preliminary segmentation mask 204. For example, the segmentation mask refinement and upsampling system 106 is provided the preliminary segmentation mask 204 and the digital visual media item 202 as inputs.

Alternatively, or additionally, in one or more implementations, the segmentation mask refinement model 110 comprises a neural network. For example, in one or more implementations, the segmentation mask refinement model 110 comprises a mask upsampling and refinement neural network as described in previously incorporated U.S. Provisional Patent Application No. 63/271,149. The segmentation mask refinement and upsampling system 106 refines and upsamples the preliminary segmentation mask 204 to generate the upsampled and refined segmentation mask 214. In particular, the segmentation mask refinement model 110, in this instance, utilizes a segmentation refinement neural network to refine and upsamples the preliminary segmentation mask 204 as described in greater detail in relation to FIGS. 4-5B. Indeed, the segmentation mask refinement model 110 utilizes a segmentation refinement neural network to recursively refine the preliminary segmentation mask 204 to generate the upsampled and refined segmentation mask 214. As mentioned above, the upsampled and refined segmentation mask 214 is more accurate than the preliminary segmentation mask 204 and has a higher resolution.

As explained in greater detail below, during generation of the upsampled and refined segmentation mask 214, the segmentation mask refinement and upsampling system 106 utilizes a neural network or other machine learning model to generate a patch-based refined segmentation mask from the preliminary segmentation mask 204. The segmentation mask refinement and upsampling system 106 then fuses the patch-based refined segmentation mask with an upsampled version of the preliminary segmentation mask 204 to generate the upsampled and refined segmentation mask 214 as explained in greater detail below.

In one or more implementations, the image editing system 104 utilizes the upsampled and refined segmentation mask 214 to modify the digital visual media item 202. For example, in some implementations, the image editing system 104 applies a filter or a digital effect to the digital visual media item 202 based on the refined segmentation mask 214. In alternative implementations, the image editing system 104 utilizes the upsampled and refined segmentation mask 214 to generate a composite digital image that combines one or more objects from the digital visual media item 202 with another digital image.

As mentioned above, the segmentation mask refinement and upsampling system 106 utilizes an image segmentation model 108 to both detect and generate low-resolution segmentation masks for any objects in an image. Object detection and instance segmentation are two important computer vision tasks whose respective goals are to localize the (one or more) objects present in the input image and to generate the masks individually for those objects. These two tasks are part of an automated and effort-free object-centric mask selection in image editing applications such as Photoshop which typically run on personal computers and desktop machines. However, conventional object detection and instance segmentation models are relatively computationally expensive and they are not suited for on-device inference. In one or more implementations, the segmentation mask refinement and upsampling system 106 utilizes an image segmentation model 108 that is an on-device friendly model that effectively handles both object detection and instance segmentation. For the image editing applications that allow users to select segmentation masks in the images, the generalization and accuracy strengths of the model are as equally important as its computational efficiency. Furthermore, the image segmentation model 108 avoids predicting many false negatives (missed the objects of interest) and many false positives (mistreating non-objects as objects), and/or poor-quality segmentation masks.

Figure 3:
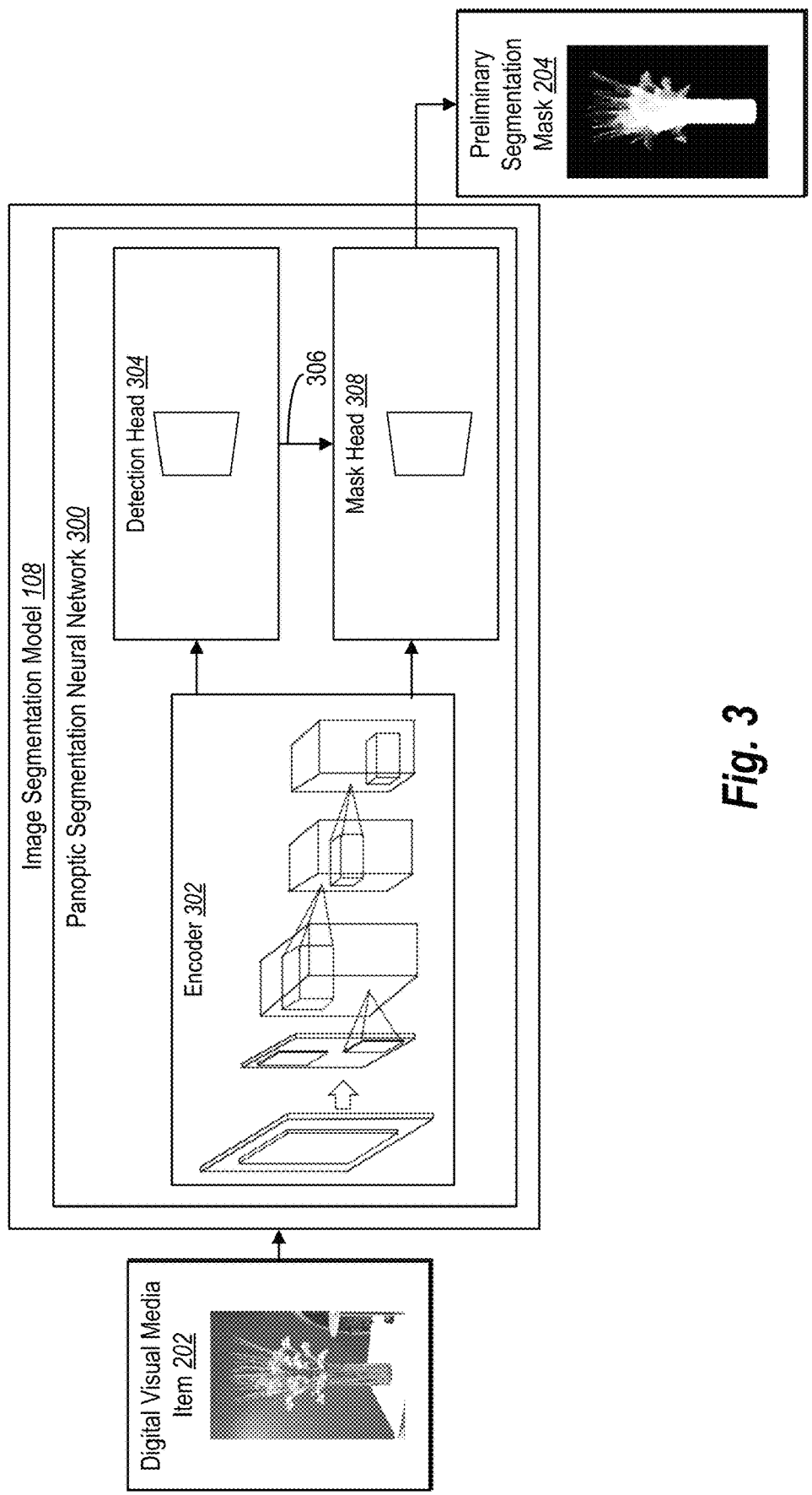
FIG. 3 illustrates an image segmentation model generating preliminary segmentation masks in accordance with one or more implementations.

As shown by FIG. 3, image segmentation model 108 comprises a panoptic segmentation neural network 300 in one or more implementations. The panoptic segmentation neural network 300 includes a backbone network or encoder 302, a detection head (or neural network decoder detection head) 304, and a mask head (or neural network decoder masking head) 164. The encoder 302 extracts features form the a downscaled digital image (or an image of a predetermined resolution). The detection head 304 detects all objects in the digital image based on the encoded features from the encoder by generating bounding boxes 306 with a classification score of the object in the bounding box's objectness (i.e., how confident the detection head is that what is in the bounding box is an object). The mask head 308 uses a given bounding box 306 from the detection head 304 and features from the encoder 302 to generate preliminary segmentation masks 204. The encoder/backbone 302, in one or more implementations, is carefully designed for on-device inference and has a smaller computational footprint than conventional large models like ResNet-50. Previously incorporated U.S. No. 63/271,147 includes additional details of an example panoptic segmentation neural network 300 (i.e., DOMO).

In alternative implementations, the panoptic segmentation neural network 300 includes another object instance segmentation head or model such as the techniques and approaches found in Ning Xu et al., "Deep GrabCut for Object Selection," published Jul. 14, 2017, the entirety of which is incorporated herein by reference; the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which are incorporated herein by reference in their entirety.

In any event, the segmentation mask refinement and upsampling system 106 generates or otherwise obtains a preliminary segmentation mask 204. The segmentation mask refinement and upsampling system 106 then refines and upsamples the preliminary segmentation mask 204 to generate an upsampled and refined segmentation mask 214.

More specifically, the segmentation mask refinement and upsampling system 106 refines and upsamples the preliminary segmentation mask 204 utilizing a segmentation mask refinement model 110. One or more implementations described herein include a segmentation mask refinement model 110 that utilizes a neural network that includes an iterative or recursive decoder for flexible and accurate object mask upsampling and refinement. Indeed, in one or more implementations, the segmentation mask refinement model 110 generates an upsampled and refined object mask for a digital image (or other digital image) using a segmentation refinement neural network having a recursive decoder that incorporates patch refinements and recursive refinements under an internal unsupervised spatial guidance. In particular, in some cases, the recursive decoder integrates recursive mask-wise refinements coupled with a hierarchy of patch modules (e.g., hierarchical point-wise refining blocks) to iteratively improve the quality of segmentation masks in higher resolutions. In some instances, the segmentation refinement neural network receives a low-resolution object mask and recovers/refines details while upsampling to an original or otherwise higher resolution.

Figure 4:
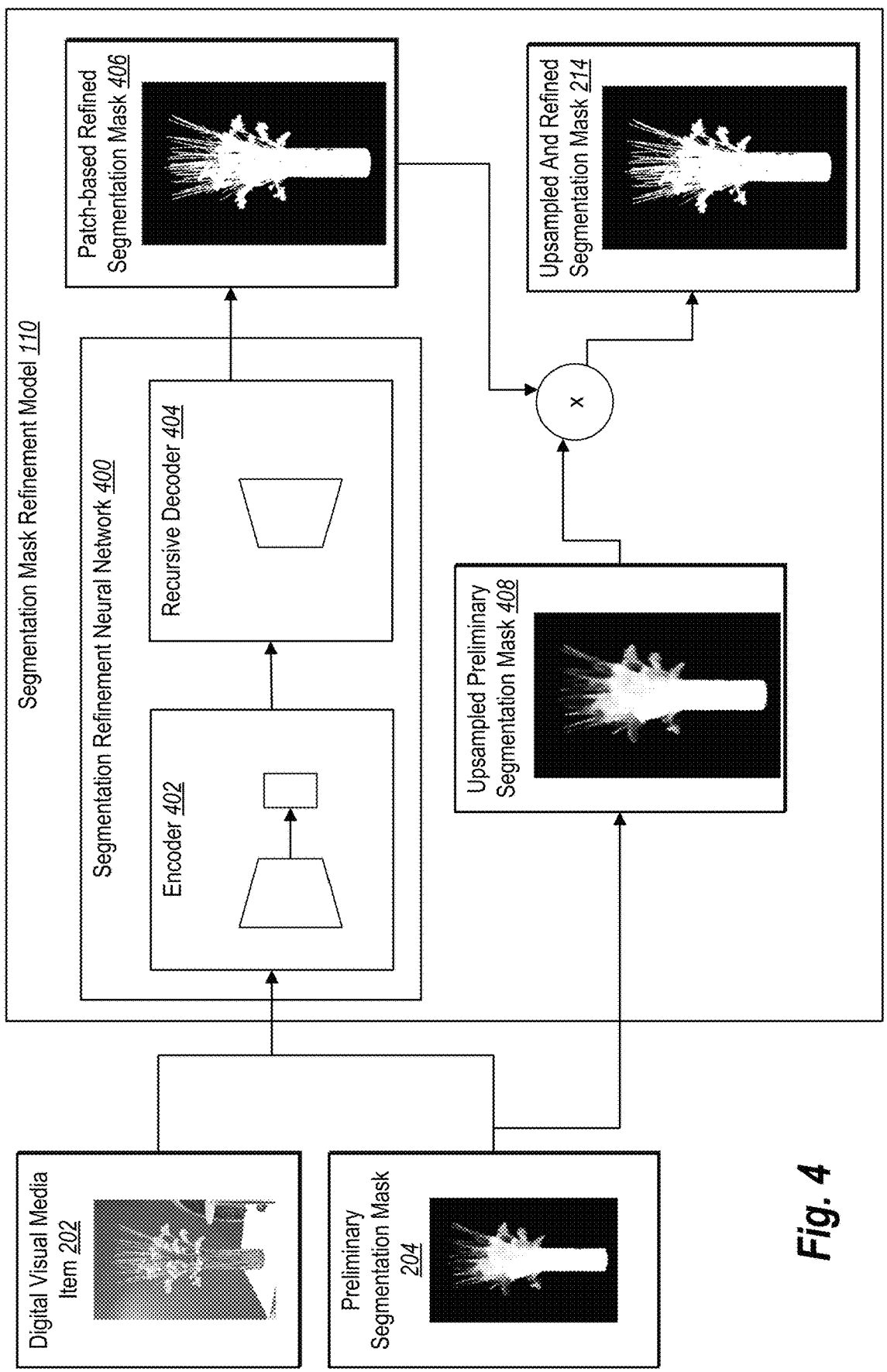
FIG. 4 illustrates the segmentation mask refinement and upsampling system generating an upsampled and refined segmentation mask from a preliminary segmentation mask in accordance with one or more implementations.

To provide an illustration, as shown by FIG. 4, in one or more implementations, the segmentation mask refinement model 110 generates, utilizing a segmentation refinement neural network 400, a patch-based refined segmentation mask 406 from the preliminary segmentation mask 204. For example, in some implementations, the segmentation mask refinement model 110 utilizes a segmentation refinement neural network having an encoder-decoder network architecture. To illustrate, in some instances, the segmentation refinement neural network includes an encoder 402 and a recursive decoder 404. Accordingly, the segmentation mask refinement model 110 utilizes the encoder 402 to generate various encoded feature maps corresponding to the preliminary segmentation mask 204 and the digital image 202 and utilizes the recursive decoder 404 to generate the upsampled and refined segmentation mask based on the encoded feature maps.

Figure 8:
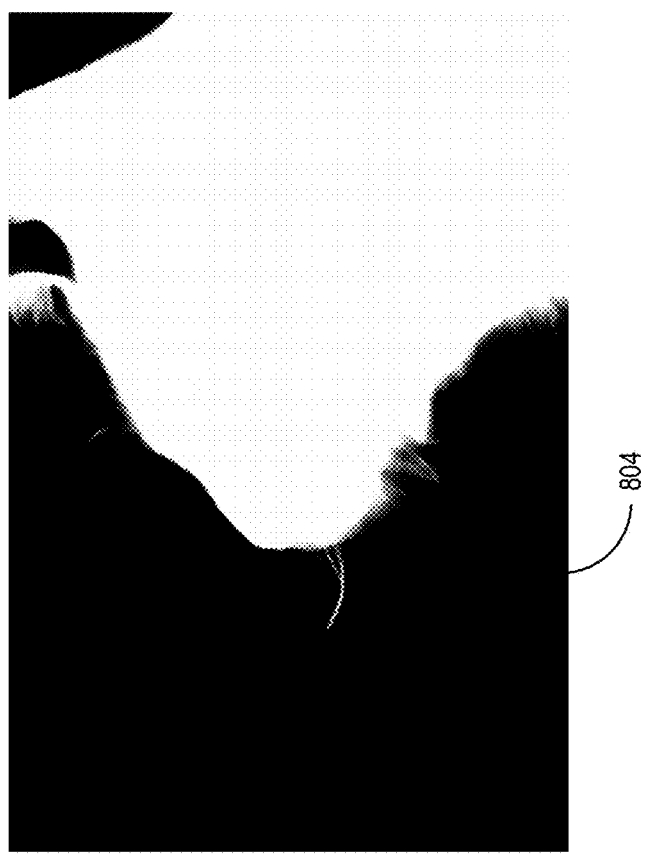
FIG. 8 illustrates a comparison of a naïve patch-based upsampled segmentation mask and an upsampled and refined segmentation mask in accordance with one or more embodiments.
Figure 8:

In some implementations, the recursive decoder 404 includes a deconvolution branch and a refinement branch as described in relation to FIG. 8. In some cases, the segmentation mask refinement model 110 utilizes the deconvolution branch to generate one or more decoded feature maps corresponding to the digital image based on the encoded feature maps. Further, the segmentation mask refinement model 110 utilizes the refinement branch to generate patch-based refined segmentation mask 406 for the digital image based on the decoded feature maps and the encoded feature maps. For example, in some implementations, the segmentation refinement neural network 400 receives the preliminary segmentation mask 204 and recursively refines the preliminary segmentation mask 204 using the refinement branch.

In some implementations, the refinement branch generates the patch-based refined segmentation mask 406 via a hierarchy of hierarchical point-wise refining blocks. To illustrate, in some cases, the segmentation refinement neural network 400 further utilizes a plurality of additional hierarchical point-wise refining blocks to generate the patch-based refined segmentation mask 406 by recursively refining the preliminary segmentation mask 204. In some cases, the additional hierarchical point-wise refining blocks make up a multi-cycle up-sampling process that upsamples the preliminary segmentation mask 204 while refining the preliminary segmentation mask 204.

In some implementations, the segmentation refinement neural network 400 generates an uncertainty map that identifies pixels having an associated uncertainty whether or not the pixels correspond to the object of the preliminary segmentation mask to be refined. In such implementations, the segmentation mask refinement model 110 utilizes each hierarchical point-wise refining block to refine the preliminary segmentation mask 204 based on the respective uncertainty map by refining the uncertain patches of the preliminary segmentation mask 204. The uncertainty map provides guidance to the areas (e.g., patches) of a preliminary segmentation mask 204 to be refined. Thus, by utilizing the uncertainty map, the segmentation mask refinement model 110 limits computational costs by avoiding the refinement of every pixel/location of a preliminary segmentation mask 204.

Thus, the segmentation mask refinement model 110 utilizes a patch-based refinement process based on the digital visual media item 202 utilizing the segmentation refinement neural network 400 to generate the patch-based refined segmentation mask 406. To illustrate, in some implementations, the segmentation mask refinement model 110 determines one or more patches corresponding to the full resolution digital visual media item 202. In one or more implementations, a patch includes a portion of a digital image that includes less than the entirety of the full resolution digital visual media item 202. In some implementations, a patch includes a resolution that corresponds to the original resolution associated with the full resolution digital visual media item 202. For example, in one or more implementations, a patch includes a number of pixels included in the corresponding portion of the full resolution digital visual media item 202 at the original resolution. In other words, in some cases, a patch includes a fractional portion of a digital image and also includes a corresponding fraction of the pixels represented by the full resolution digital image at the original resolution.

Accordingly, in some implementations, the segmentation mask refinement model 110 utilizes the segmentation refinement neural network 400 to generate the patch-based refined segmentation mask 406 based on the preliminary segmentation mask 204 and the one or more patches corresponding to the full resolution digital visual media item 202. For example, in some implementations, the segmentation mask refinement model 110 utilizes the segmentation refinement neural network 400 to refine a portion of the preliminary segmentation mask 204 based on a patch of the digital visual media item 202 corresponding to that portion. The segmentation mask refinement model 110 further utilizes the segmentation refinement neural network 400 to refine an additional portion of the preliminary segmentation mask 204 based on another patch that corresponds to that additional portion. Thus, the segmentation mask refinement model 110 utilizes the one or more patches to recover details in the original resolution associated with the full resolution digital visual media item 202.

In one or more implementations, the segmentation refinement neural network 400 comprises a mask upsampling and refinement neural network as described in previously incorporated U.S. Provisional Patent Application No. 63/271,149. In alternative implementations, the segmentation refinement neural network 400 comprises a segmentation refinement neural network as described in U.S. patent application Ser. No. 17/200,525 filed on Mar. 24, 2021 and entitled "GENERATING REFINED SEGMENTATIONS MASKS VIA METICULOUS OBJECT SEGMENTATION," the entire contents of which are hereby incorporated by reference in their entirety. In still further implementations, the segmentation refinement neural network 400 comprises a segmentation refinement neural network as described in U.S. patent application Ser. No. 16/988,408, filed on Aug. 7, 2020 and entitled "GENERATING REFINED SEGMENTATION MASKS BASED ON UNCERTAIN PIXELS," the entire contents of which are hereby incorporated by reference in their entirety.

As mentioned above, patch-based refining processes, in some implementations, introduce artifacts/inaccuracies due to loss of a global perspective during the refining and upsampling processes. To avoid such artifacts/inaccuracies, the segmentation mask refinement and upsampling system 106 utilizes the preliminary segmentation mask 204 to recover the global perspective. In particular, as shown by FIG. 4, the segmentation mask refinement and upsampling system 106 generates an upsampled preliminary segmentation mask 408 by upsampling the preliminary segmentation mask 204. For example, the segmentation mask refinement and upsampling system 106 upsamples the preliminary segmentation mask 204 to the resolution of the digital visual media item 202 or the patch-based refined segmentation mask 406 (if different).

The segmentation mask refinement and upsampling system 106 then fuses the upsampled preliminary segmentation mask 408 and the patch-based refined segmentation mask 406 to generate the upsampled and refined segmentation mask 214. To fuse the upsampled preliminary segmentation mask 408 and the patch-based refined segmentation mask 406, the segmentation mask refinement and upsampling system 106, in one or more embodiments, performs a thresholding operation to binarize each pixel location as being part of the object being segmented or not part of the object being segmented. To do so, the segmentation mask refinement and upsampling system 106 bases the thresholding off of a blending of the upsampled preliminary segmentation mask 408 and the patch-based refined segmentation mask 406. For example, in some implementations, interior portions of the segmentation mask may be better informed by the upsampled preliminary segmentation mask 408 and border portions may be better informed by the patch-based refined segmentation mask 406. As such, the segmentation mask refinement and upsampling system 106 weighs which confidence values to base the thresholding operation (or how to combine the confidence values) from the upsampled preliminary segmentation mask 408 and the patch-based refined segmentation mask 406. More details about generating the upsampled and refined segmentation mask 214 are provided with reference to FIGS. 5A and 5B.

Figure 5A:
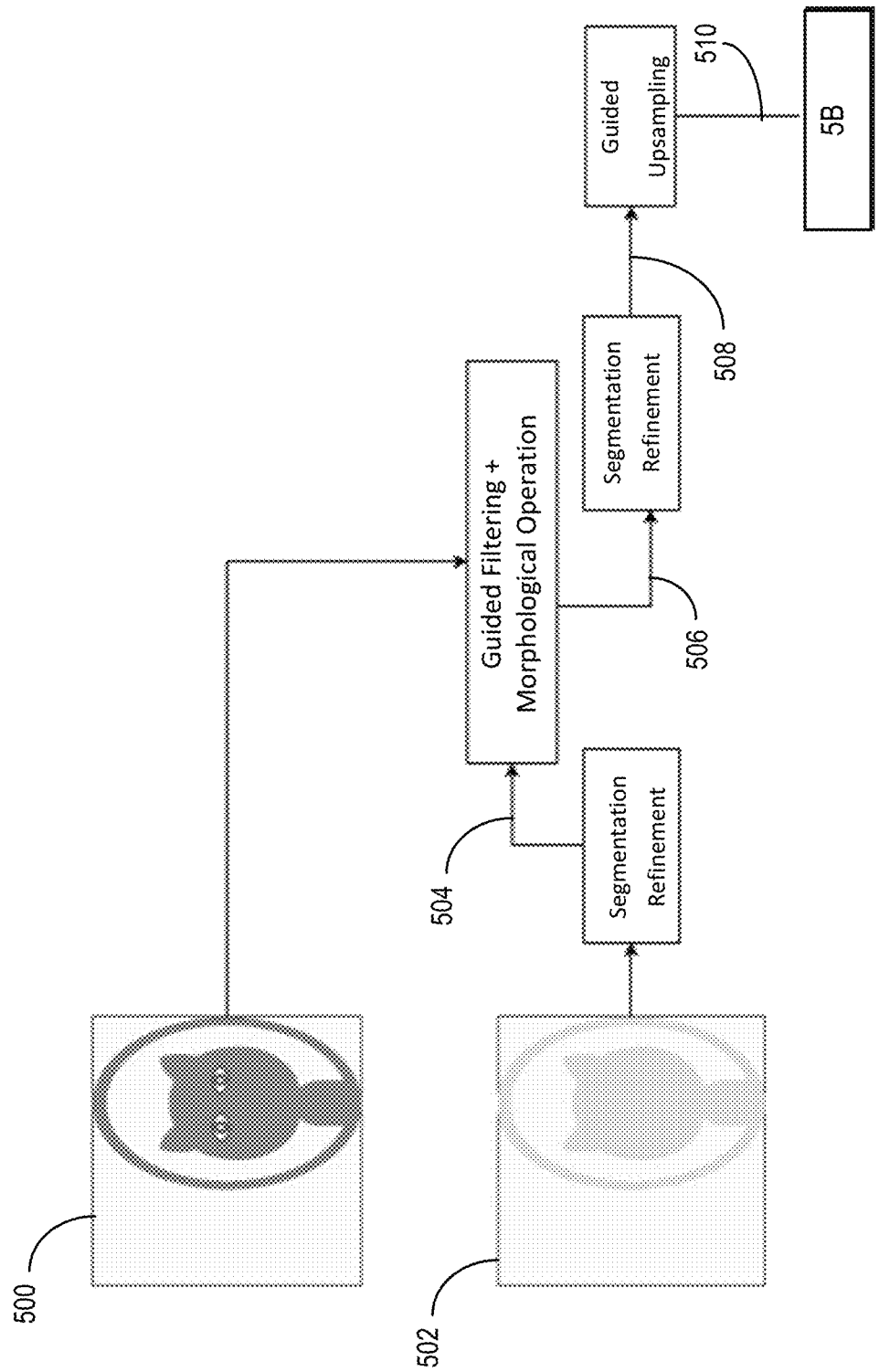
FIGS. 5A-5B illustrate various acts performed by the segmentation mask refinement and upsampling system when upsampling and refining a preliminary segmentation mask in accordance with one or more embodiments.
Figure 5B:
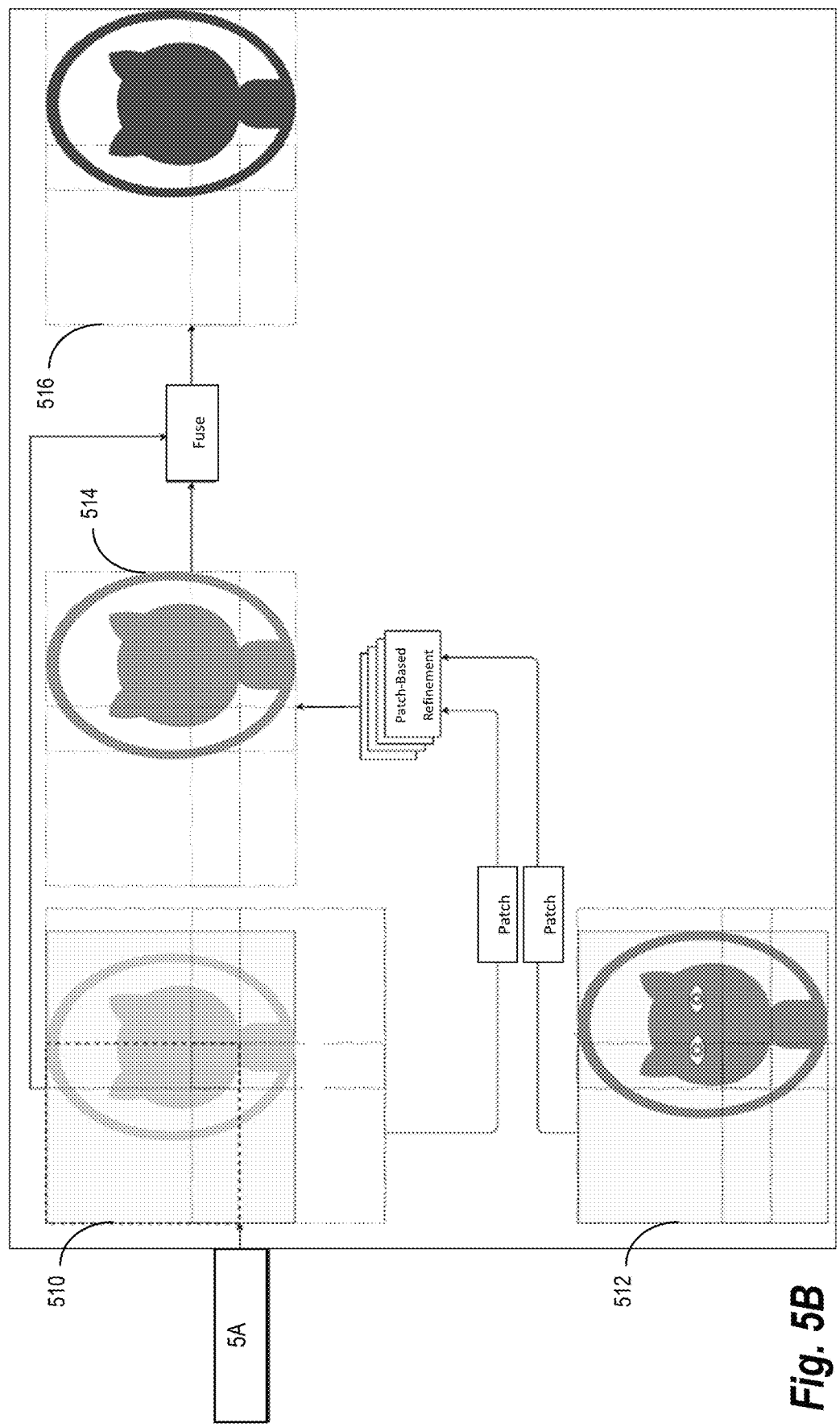

As shown in FIGS. 5A-5B, the segmentation mask refinement and upsampling system 106 generates an upsampled and refined segmentation mask 516. For example, in some implementations, the segmentation mask refinement and upsampling system 106 utilizes a segmentation refinement neural network 400 to recursively refine a preliminary segmentation mask 502 (also called herein a low resolution mask) to generate the upsampled and refined segmentation mask 516 (also called herein a high resolution mask).

In one or more embodiments, the segmentation mask refinement and upsampling system 106 receives the preliminary segmentation mask 502 (i.e., the low resolution segmentation mask) from another machine learning model or combination of machine learning models. For example, as described above in relation to FIG. 3, the preliminary segmentation mask is generated by an image segmentation model 108. Alternatively, the image editing system 104 utilizes a conventional segmentation neural network to generate the preliminary segmentation mask 502. For example, in one or more implementations, to generate a preliminary segmentation mask 502, image editing system 104 utilizes a salient object segmentation neural network such as that described by Pao et al. in U.S. patent application Ser. No. 15/967,928 filed on May 1, 2018, entitled ITERATIVELY APPLYING NEURAL NETWORKS TO AUTOMATICALLY IDENTIFY PIXELS OF SALIENT OBJECTS PORTRAYED IN DIGITAL IMAGES, the contents of which are expressly incorporated herein by reference in their entirety. In another embodiment, the image editing system 104, to generate a preliminary segmentation mask, utilizes an image mask generation system such as that described by Zhang et al. in U.S. patent application Ser. No. 16/988,055 filed on Aug. 7, 2020, entitled GENERATING AN IMAGE MASK FOR A DIGITAL IMAGE BY UTILIZING A MULTI-BRANCH MASKING PIPELINE WITH NEURAL NETWORKS, the contents of which are expressly incorporated herein by reference in their entirety. In yet another embodiment, to generate a preliminary segmentation mask, the image editing system 104 utilizes a multi-model object selection system such as that described by Price et al. in U.S. Patent Application Publication No. 2019/0236394 filed on Apr. 5, 2019, entitled UTILIZING INTERACTIVE DEEP LEARNING TO SELECT OBJECTS IN DIGITAL VISUAL MEDIA, the contents of which are expressly incorporated herein by reference in their entirety.

As mentioned above, in one or more embodiments, the segmentation mask refinement and upsampling system 106 receives a preliminary segmentation mask 502 and generates an upsampled and refined segmentation mask 516. As shown in FIG. 5A, the segmentation mask refinement and upsampling system 106 receives/determines (e.g., identifies) the a higher resolution image 512, a corresponding lower resolution image 500, and a corresponding preliminary segmentation mask 502. Further, as illustrated, the image 500/512 depicts an object (e.g., a cat). As will be explained, in one or more embodiments, the segmentation mask refinement and upsampling system 106 generates an upsampled and refined segmentation mask 516 to distinguish the object (e.g., the cat) depicted in the image 500/512 from the background or other objects depicted in the digital image500/512. The digital image 500 shown in FIG. 5A can comprise a resolution corresponding to the resolution of the preliminary segmentation mask 502. Thus, as shown in FIG. 5A, the segmentation mask refinement and upsampling system 106 accesses a low-resolution copy 500 of the digital image. For example, in some embodiments, the segmentation mask refinement and upsampling system 106 generates a copy of the digital image that includes a resolution that is lower than an original or previous resolution of the digital image 512.

As shown in FIG. 5A, the segmentation mask refinement and upsampling system 106 performs a refinement (labeled segmentation refinement) of the preliminary segmentation mask 502. In particular, the segmentation mask refinement and upsampling system 106 utilizes the segmentation refinement neural network 400 to generate a refined preliminary segmentation mask 504. More specifically, the segmentation mask refinement and upsampling system 106 utilizes the segmentation refinement neural network 400 with a single patch (the entire digital image 500) and without upsampling. For example, (in reference to FIG. 6) the segmentation mask refinement and upsampling system 106 performs a single refinement in the refinement branch and does not perform any upsampling to generate the refined preliminary segmentation mask 504 from the preliminary segmentation mask 502. The refined preliminary segmentation mask 504 will be more accurate (e.g., the confidence values will be more accurate) than the preliminary segmentation mask 502.

The segmentation mask refinement and upsampling system 106 then generates a filtered and refined preliminary segmentation mask 506 from the refined preliminary segmentation mask 504. In particular, the segmentation mask refinement and upsampling system 106 preforms guided filtering and optionally a morphological operation on the refined preliminary segmentation mask 504 to generate the filtered and refined preliminary segmentation mask 506. More specifically, the segmentation mask refinement and upsampling system 106 performs the guided filtering on the refined preliminary segmentation mask 504 by determining a filtering output by considering the content of the low-resolution image 500. In other words, the segmentation mask refinement and upsampling system 106 utilizes the guided filtering to improve the refined preliminary segmentation mask 504 to recapture details (particularly along borders) from the low-resolution image 500 lost during the generation of the refined preliminary segmentation mask 504. In one or more implementations, the segmentation mask refinement and upsampling system 106 utilizes a bilateral filter, a guided bilateral filter, or a guided filter such as that described in U.S. Pat. No. 9,342,869, the entire contents of which are hereby incorporated by reference in their entirety. In another implementation, the segmentation mask refinement and upsampling system 106 utilizes a guided filter such as that described by He et al. in Guided Image Filtering, IEEE TRANSACTIONS ON PATTERN ANALYSIS AND MACHINE INTELLIGENCE, VOL. 35, 205, the entire contents of which are hereby incorporated by reference in their entirety. Alternatively, the segmentation mask refinement and upsampling system 106 utilizes a guided filter such as that described by He et al. in Fast Guided Filter, Computer Vision and Pattern Recognition, arXiv:1505.00996, 2015, the entire contents of which are hereby incorporated by reference in their entirety.

Additionally, the segmentation mask refinement and upsampling system 106 optionally performs a morphological operation (i.e., binarization of the refined preliminary segmentation mask 504). For example, the segmentation mask refinement and upsampling system 106 performs erosion and the dilation or dilation and then erosion. In particular, the segmentation mask refinement and upsampling system 106 performs morphological erosion to remove islands and small artifacts to improve the refined preliminary segmentation mask 504. Along related lines, the segmentation mask refinement and upsampling system 106 performs morphological dilation to fill small holes in the refined preliminary segmentation mask 504.

As shown in FIG. 5A, the segmentation mask refinement and upsampling system 106 performs a segmentation refinement of the filtered and refined preliminary segmentation mask 506. In particular, the segmentation mask refinement and upsampling system 106 utilizes the segmentation refinement neural network 400 to generate a refined-filtered preliminary segmentation mask 508. More specifically, the segmentation mask refinement and upsampling system 106 utilizes the segmentation refinement neural network 400 with a single patch (the entire image 500) and without upsampling. For example, (in reference to FIG. 6) the segmentation mask refinement and upsampling system 106 performs a single refinement in the refinement branch and does not perform any upsampling to generate the refined-filtered preliminary segmentation mask 508 from the filtered and refined preliminary segmentation mask 506. The refined-filtered preliminary segmentation mask 508 will be more accurate (e.g., the confidence values will be more accurate) than the filtered and refined preliminary segmentation mask 506.

The segmentation mask refinement and upsampling system 106 then upsamples the refined-filtered preliminary segmentation mask 508 to a higher resolution. For example, the segmentation mask refinement and upsampling system 106 upsamples the refined-filtered preliminary segmentation mask 508 to the resolution of the higher-resolution digital image 512 to generate the upsampled preliminary segmentation mask 510. In one or more implementations, the segmentation mask refinement and upsampling system 106 performs guided upsampling to generate the upsampled preliminary segmentation mask 510 from the refined-filtered preliminary segmentation mask 508.

In alternative implementations, the segmentation mask refinement and upsampling system 106 generates the upsampled preliminary segmentation mask 510 directly from the preliminary segmentation mask 502 without the two segmentation refinement processes or the guided filtering and morphological operation. In one or more implementations, however, the two segmentation refinement processes or the guided filtering and morphological operation results in a more accurate upsampled preliminary segmentation mask 510.

The segmentation mask refinement and upsampling system 106 then utilizes a patch-based refinement process based on the higher-resolution image 512 utilizing the segmentation refinement neural network 400 to generate a patch-based refined segmentation mask 514. To illustrate, in some implementations, the segmentation mask refinement and upsampling system 106 determines one or more patches corresponding to the full resolution digital image 512. In one or more embodiments, a patch includes a portion of a digital image that includes less than the entirety of the full resolution digital image 512. In some implementations, a patch includes a resolution that corresponds to the original resolution associated with the full resolution digital image 512. For example, in one or more embodiments, a patch includes a number of pixels included in the corresponding portion of the full resolution digital image 512 at the original resolution. In other words, in some cases, a patch includes a fractional portion of a digital image and also includes a corresponding fraction of the pixels represented by the full resolution digital image 512 at the original resolution.

Accordingly, in some embodiments, the segmentation mask refinement and upsampling system 106 utilizes the segmentation refinement neural network 400 to generate the patch-based refined segmentation mask 514 based on the upsampled preliminary segmentation mask 510 and the one or more patches corresponding to the full resolution digital image 512. For example, in some implementations, the segmentation mask refinement and upsampling system 106 utilizes the segmentation refinement neural network 400 to refine a portion of the upsampled preliminary segmentation mask 510 based on a patch corresponding to that portion. The segmentation mask refinement and upsampling system 106 further utilizes the segmentation refinement neural network 400 to refine an additional portion of the upsampled preliminary segmentation mask 510 based on another patch that corresponds to that additional portion. Thus, the segmentation mask refinement and upsampling system 106 utilizes the one or more patches to recover details in the original resolution associated with the full resolution digital image 512.

By utilizing a segmentation refinement neural network that converts a low-resolution segmentation mask to a high resolution segmentation mask, the segmentation mask refinement and upsampling system 106 operates more flexibly than conventional systems. In particular, by using a segmentation refinement neural network to recursively refine a segmentation mask for a digital image, the segmentation mask refinement and upsampling system 106 flexibly adapts to high-resolution digital images. Indeed, the segmentation mask refinement and upsampling system 106 flexibly generates high-resolution segmentation masks that provide a greater amount of detail than produced under conventional systems to capture the hard-to-see details that are better represented in high-resolution digital images.

As mentioned above, patch-based refining processes, in some implementations, introduce artifacts/inaccuracies due to loss of a global perspective during the refining and upsampling processes. To avoid such artifacts/inaccuracies, the segmentation mask refinement and upsampling system 106 utilizes the preliminary segmentation mask 204 to recover the global perspective. To do so, the segmentation mask refinement and upsampling system 106 fuses the upsampled preliminary segmentation mask 510 and the patch-based refined segmentation mask 514 to generate the upsampled and refined segmentation mask 516.

To fuse the upsampled preliminary segmentation mask 510 and the patch-based refined segmentation mask 514, the segmentation mask refinement and upsampling system 106 performs a thresholding operation to binarize each pixel location as being part of the mask or not part of the mask. To do so, the segmentation mask refinement and upsampling system 106 bases the thresholding off of a blending of the upsampled preliminary segmentation mask 510 and the patch-based refined segmentation mask 514. For example, in some implementations, interior portions of the mask may be better informed by the upsampled preliminary segmentation mask 510 and border portions may be better informed by the patch-based refined segmentation mask 514. As such, the segmentation mask refinement and upsampling system 106 determines which confidence values to base the thresholding operation (or how to combine the confidence values) from the upsampled preliminary segmentation mask 510 and the patch-based refined segmentation mask 514.

For example, for interior locations, the segmentation mask refinement and upsampling system 106 uses the confidence values from the upsampled preliminary segmentation mask 510 or a blending of the confidence values from the upsampled preliminary segmentation mask 510 and the patch-based refined segmentation mask 514 with more weight being given to the confidence values of the upsampled preliminary segmentation mask 510. On the other hand, for border or exterior locations of the segmentation mask, the segmentation mask refinement and upsampling system 106 uses the confidence values from the patch-based refined segmentation mask 514 or a blending of the confidence values from the upsampled preliminary segmentation mask 510 and the patch-based refined segmentation mask 514 with more weight being given to the confidence values of the patch-based refined segmentation mask 514.

More specifically, the segmentation mask refinement and upsampling system 106 fuses the upsampled preliminary segmentation mask 510 and the patch-based refined segmentation mask 514 by weighting the confidence values of the patch-based refined segmentation mask 514 and the confidence values of the upsampled preliminary segmentation mask 510 based on a distance to an edge or outer border of the patch-based refined segmentation mask or the upsampled preliminary segmentation mask. For example, in one or more embodiments, the segmentation mask refinement and upsampling system 106 gives higher weight to confidence values of the upsampled preliminary segmentation mask 510 at positions a threshold distance from the edge or outer border of the patch-based refined segmentation mask 514 or the upsampled preliminary segmentation mask 510. Along related lines, in one or more embodiments, the segmentation mask refinement and upsampling system 106 gives higher weight to confidence values of the patch-based refined segmentation mask 514 at positions with a threshold distance from the edge or outer border of the patch-based refined segmentation mask 517 or the upsampled preliminary segmentation mask 510.

Figure 6:
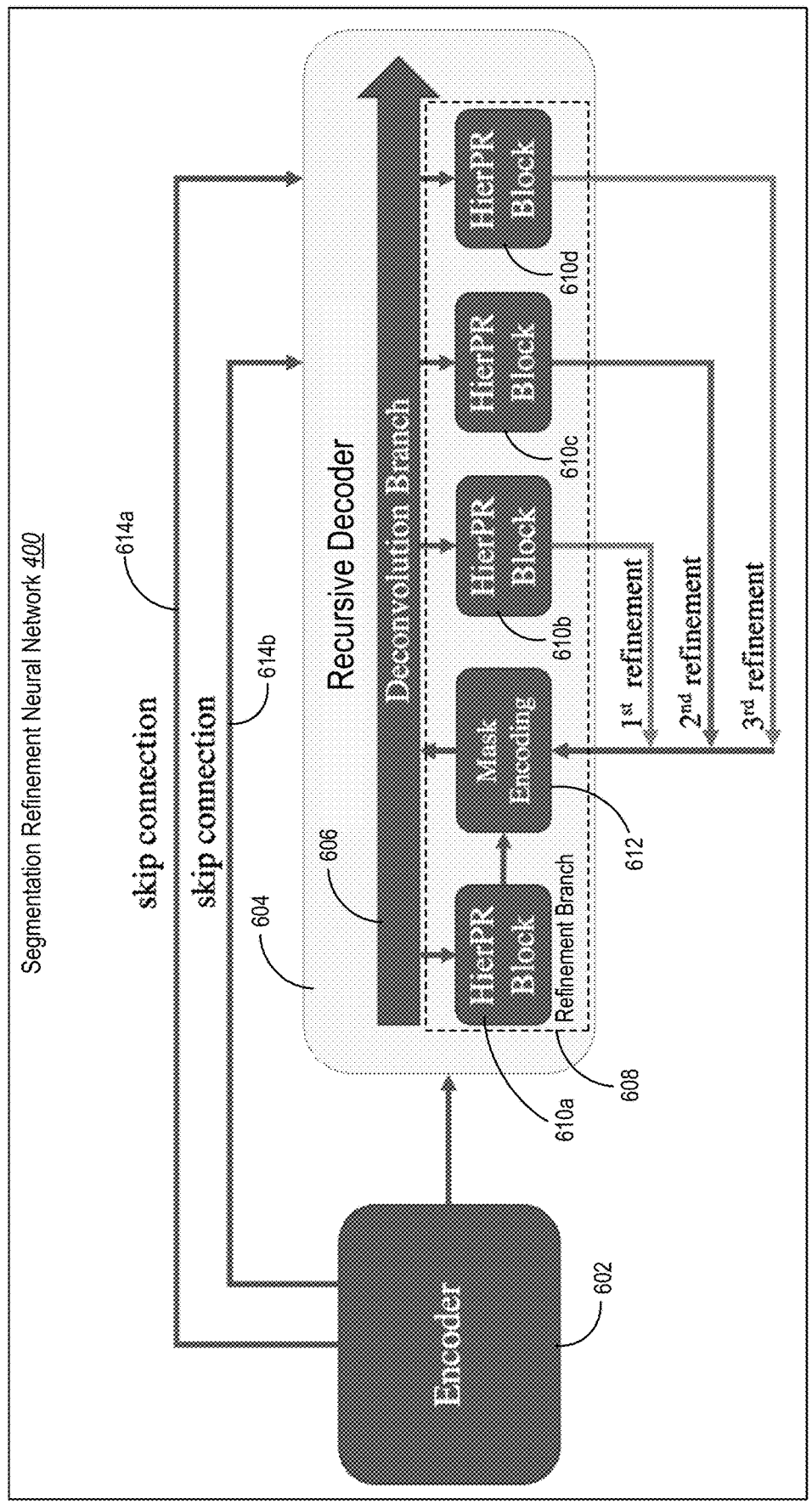
FIG. 6 illustrates an encoder-decoder network architecture of a segmentation refinement neural network in accordance with one or more embodiments.

As discussed above, in one or more embodiments, the segmentation mask refinement and upsampling system 106 utilizes a segmentation refinement neural network 400 having an encoder-decoder network architecture. For example, FIG. 6 illustrates an encoder-decoder network architecture of a segmentation refinement neural network 400 in accordance with one or more embodiments. As shown in FIG. 6, a segmentation refinement neural network 400 includes an encoder 602. The encoder 602 can include various network/encoder architectures. For example, in some implementations, the encoder 602 includes a feature extraction network. For example, in one or more embodiments, the encoder 602 includes a convolutional neural network. In some implementations, the encoder 602 further includes a neural network backbone. For example, in some cases, the encoder 602 includes a residual neural network backbone. In some implementations, the encoder 602 includes a mobile neural network backbone.

For example, in one or more implementations, the encoder 602 comprises includes at least one of the convolutional neural network architectures described in U.S. Pat. No. 10,460,214, entitled Deep Salient Conventional Neural Networks For Efficient Digital Object Segmentation, filed on Oct. 31, 2017, which is incorporated herein by reference in its entirety. In still further implementations, the encoder 602 comprises the backbone neural network described in U.S. patent application Ser. No. 16/988,608, entitled Generating Upsampled and Refined Segmentation masks Based On Uncertain Pixels, filed on Aug. 7, 2020, which is incorporated herein by reference in its entirety. In still further implementations, the encoder 602 comprises the encoder described by Zhao et al., in Pyramid scene parsing network, In Proceedings of the IEEE conference on computer vision and pattern recognition, pages 2881-2890, 2017, which is incorporated herein by reference in its entirety. In such implementations, the encoder 602 optionally comprises ResNet50 and MobileNetV3 backbones as described, respectively, by He et al. in Deep Residual Learning For Image Recognition In Proceedings of the IEEE conference on computer vision and pattern recognition, pages 770-778, 2016, and Howard et al., in Searching For Mobilenetv3, In Proceedings of the IEEE International Conference on Computer Vision, pages 1314-1324, 2019, each of which are hereby incorporated by reference in their entirety.

In one or more embodiments, the segmentation mask refinement and upsampling system 106 utilizes the encoder 602 to extract encoded feature maps from a digital image. In one or more embodiments, a feature map generally includes a set of numerical values representing features utilized by a neural network, such as a mask upsampling and refinement neural network. To illustrate, in some instances, a feature map includes a set of values corresponding to latent and/or patent attributes and characteristics of an input analyzed by a neural network (e.g., a digital image). In one or more embodiments, an encoded feature map includes a feature map generated by an encoder of a neural network. For example, in some cases, an encoded feature map includes a set of encoded values corresponding to latent and/or patent attributes and characteristics of an input analyzed by the neural network or, more specifically, the encoder (e.g., a digital image). In contrast, in one or more embodiments, a decoded feature map includes a feature map generated by a decoder of a neural network. For example, in some cases, a decoded feature map includes a set of decoded values corresponding to latent and/or patent attributes and characteristics of an input analyzed by the neural network or, more specifically, the decoder.

As further shown in FIG. 6, the segmentation refinement neural network 400 also includes a recursive decoder 604. In one or more embodiments, a recursive decoder includes a neural network decoder that generates an output using a recursive process. In particular, in one or more embodiments, a recursive decoder includes a neural network decoder that generates a patch-based refined segmentation mask corresponding to a digital image using a recursive process. For example, in some implementations, a recursive decoder includes a neural network decoder that generates a segmentation mask based on an input to the recursive decoder (e.g., a digital image or a resized low-resolution segmentation mask corresponding to the digital image) and iteratively refines the segmentation mask (e.g., generates upsampled and refined segmentation masks).

As shown in FIG. 6, the recursive decoder 604 includes a deconvolution branch 606. In one or more embodiments, a deconvolution branch includes a component of a mask upsampling and refinement neural network that generates decoded feature maps. In particular, in some embodiments, a deconvolution branch includes one or more deconvolutional layers of a recursive decoder of a mask upsampling and refinement neural network that generates decoded feature maps. For example, in some implementations, a deconvolution branch includes one or more deconvolutional layers that generate decoded feature maps based on inputs to the deconvolution branch.

Indeed, in one or more embodiments, the segmentation mask refinement and upsampling system 106 utilizes the deconvolution branch 606 of the recursive decoder 604 to generate a plurality of decoded feature maps. For example, in some implementations, the segmentation mask refinement and upsampling system 106 utilizes the deconvolution branch 606 to generate one or more decoded feature maps based on one or more of the encoded feature maps generated by the encoder 602. In some implementations, the segmentation mask refinement and upsampling system 106 utilizes the deconvolution branch 606 to generate one or more decoded feature maps further based on values (e.g., encodings of coarse-to-fine variations) generated by the refinement branch 608 of the recursive decoder 604.

In one or more embodiments, the segmentation mask refinement and upsampling system 106 utilizes the deconvolution branch 606 to recover the resolution of feature maps with respect to the input of the segmentation refinement neural network 400. In particular, in some cases, the segmentation mask refinement and upsampling system 106 utilizes the deconvolution branch 606 to gradually increase the resolution of the decoded feature maps. For example, in some implementations, the segmentation mask refinement and upsampling system 106 utilizes the deconvolution branch 606 to implement a gradually decreasing stride when generating the decoded feature maps (strides of 8, 8, 4, and 2 as one example implementation).

As shown in FIG. 6, and as suggested above, the recursive decoder 604 further includes a refinement branch 608. In one or more embodiments, a refinement branch includes a component of a mask upsampling and refinement neural network that generates and refines segmentation masks. In particular, in some embodiments, a refinement branch includes a component of a recursive decoder of a mask upsampling and refinement neural network that generates and refines segmentation masks. For example, in some cases, a refinement branch generates a segmentation mask corresponding to an input of the mask upsampling and refinement neural network and recursively refines the segmentation mask (e.g., by generating subsequent upsampled and refined segmentation masks).

In one or more embodiments, the segmentation mask refinement and upsampling system 106 utilizes the refinement branch 608 to generate and refine a segmentation mask. For example, in one or more embodiments, the segmentation mask refinement and upsampling system 106 utilizes the refinement branch to generate and refine a segmentation mask based on the decoded feature maps generated by the deconvolution branch 606. In some instances, the segmentation mask refinement and upsampling system 106 utilizes the refinement branch 608 to generate and refine a segmentation mask further based on encoded feature maps generated by the encoder 602. In some implementations, the segmentation mask refinement and upsampling system 106 utilizes the refinement branch 608 to generate and refine a segmentation mask further based on other outputs, such as those generated by components of the refinement branch 608 itself as will be discussed in more detail below.

In some embodiments, the segmentation mask refinement and upsampling system 106 utilizes the refinement branch 608 to refine the coarse outputs from the deconvolution branch 606 (e.g., the decoded feature maps). In some implementations, the segmentation mask refinement and upsampling system 106 utilizes the refinement branch 608 to refine an averaged combination of outputs from both branches. In some cases, the segmentation mask refinement and upsampling system 106 utilizes the refinement branch 608 to perform point-wise refinements, as will be discussed below. Further, as will be discussed below, the segmentation mask refinement and upsampling system 106 utilizes the refinement branch 608 to implement relatively lower strides than the deconvolution branch 606 (e.g., strides 4, 4, 2, and 1 as one example implementation).

As shown in FIG. 6, the refinement branch 608 of the recursive decoder 604 includes hierarchical point-wise refining blocks 610*a*, 610*b*, 610*c*, 610*d*. In one or more embodiments, a hierarchical point-wise refining block includes a component of a mask upsampling and refinement neural network that generates an iteration of a segmentation mask. In particular, in some embodiments, a hierarchical point-wise refining block includes a point-wise processing unit of a recursive decoder of a mask upsampling and refinement neural network that generates a segmentation mask based on various inputs to the hierarchical point-wise refining block. In some implementations, a hierarchical point-wise refining block generates a segmentation mask (e.g., an upsampled and refined segmentation mask) that includes refinements to a segmentation mask generated by a previous hierarchical point-wise refining block. The architecture and operation of a hierarchical point-wise refining block will be discussed in more detail below.

Further, as shown in FIG. 6, the refinement branch 608 of the recursive decoder 604 also includes a mask encoding layer 612. In one or more embodiments, a mask encoding layer includes a component of a mask upsampling and refinement neural network that generates encodings of coarse-to-fine variations. In particular, in some embodiments, a mask encoding layer includes a component of a recursive decoder of a mask upsampling and refinement neural network that generates coarse-to-fine variations between segmentation masks For example, in some cases, a mask encoding layer generates encodings of coarse-to-fine variations based on a pair of segmentation masks.

In one or more embodiments, coarse-to-fine variations include differences between segmentation masks. In particular, in some embodiments, coarse-to-fine variations include differences between the segmentation represented in different segmentation masks based on a difference in resolutions of the segmentation masks. For example, in some implementations, coarse-to-fine variations include differences based on a first segmentation mask providing a more detailed segmentation when compared to a second segmentation mask due to the first segmentation mask having a higher resolution than the second segmentation mask.

Indeed, as shown in FIG. 6, the segmentation mask refinement and upsampling system 106 provides one or more decoded feature maps generated by the deconvolution branch 606 to each of the hierarchical point-wise refining blocks 610*a*-610*d*. As will be discussed more below, the segmentation mask refinement and upsampling system 106 utilizes the hierarchical point-wise refining blocks 610*a*-610*d* to generate segmentation masks as output. In particular, the segmentation mask refinement and upsampling system 106 utilizes the hierarchical point-wise refining block 610*a* to generate an initial segmentation mask and further utilizes the hierarchical point-wise refining blocks 610*b*-610*d* to refine the segmentation mask (e.g., generate upsampled and refined segmentation masks).

Though, FIG. 6 illustrates each of the hierarchical point-wise refining blocks 610*a*-610*d* as a single block, it should be understood that one or more of the hierarchical point-wise refining blocks 610*a*-610*d* include multiple hierarchical point-wise refining blocks in some embodiments. Further, as will be discussed below, in some cases, the hierarchical point-wise refining blocks 610*a*-610*d* make up a hierarchy of hierarchical point-wise refining blocks. For example, in some implementations, the hierarchical point-wise refining blocks 610*a* includes a first hierarchical point-wise refining block for generating an initial segmentation mask, and the hierarchical point-wise refining blocks 610*b*-610*d* implement a three-cycle up-sampling process that recursively upsamples the initial segmentation mask while recursively refining the initial segmentation mask.

As shown in FIG. 6, the segmentation mask refinement and upsampling system 106 provides the segmentation masks generated by the hierarchical point-wise refining blocks 610*a*-610*d* to the mask encoding layer 612. Further, the segmentation mask refinement and upsampling system 106 provides the encodings of the coarse-to-fine variations generated by the mask encoding layer 612 back to the deconvolution branch 606. Accordingly, in some embodiments, the segmentation mask refinement and upsampling system 106 utilizes the deconvolution branch 606 to generate at least some of the decoded feature maps based on the encodings of the coarse-to-fine variations.

As further shown in FIG. 6, the segmentation refinement neural network 400 further includes the skip connections 614*a* and 614*b*. In one or more embodiments, the segmentation mask refinement and upsampling system 106 utilizes the skip connections 614*a*-614*b* to provide feature values generated by components positioned early in the segmentation refinement neural network 400 to components positioned later in the segmentation refinement neural network 400. In one or more embodiments, a feature value includes a numerical value generated by a component of a neural network, such as a mask upsampling and refinement neural network. In particular, in some instances, a feature value includes a value that corresponds to one or more latent and/or patent attributes and characteristics of an input analyzed by a neural network or neural network component. In one or more embodiments, a feature value includes a low-level feature value that corresponds to one or more low-level (e.g., patch) attributes and characteristics of an input analyzed by a neural network or neural network component. Additionally, in some cases, a feature value includes a high-level feature value that corresponds to one or more high-level (e.g., global or regional) attributes and characteristics of an input analyzed by a neural network or neural network component.

Though two skip connections are shown, it should be understood that, in some implementations, the segmentation refinement neural network 400 includes fewer or additional skip connections. For example, in some implementations, the segmentation refinement neural network 400 includes a first set of skip connections connecting the last two deconvolutional of the deconvolution branch 606 to the hierarchical point-wise refining block 610*a* and the first convolutional layer of the encoder 602 and a second set of skip connections connecting the hierarchical point-wise refining blocks 610*b*-610*d* to the hierarchical point-wise refining block 610*a*. Indeed, various additional configurations are possible.

In one or more embodiments, the feature values passed via the skip connections are relatively low-value (e.g., more patch) when performing refinements with a relatively high stride. In contrast, in some embodiments, the feature values passed via the skip connections are relatively high-level (e.g., more global) when performing refinements with a relatively low stride. In some embodiments, by using a skip connection configuration as discussed above, the segmentation mask refinement and upsampling system 106 adaptively provides detail information at low resolution and semantic guidance at high resolution.

Figure 7:
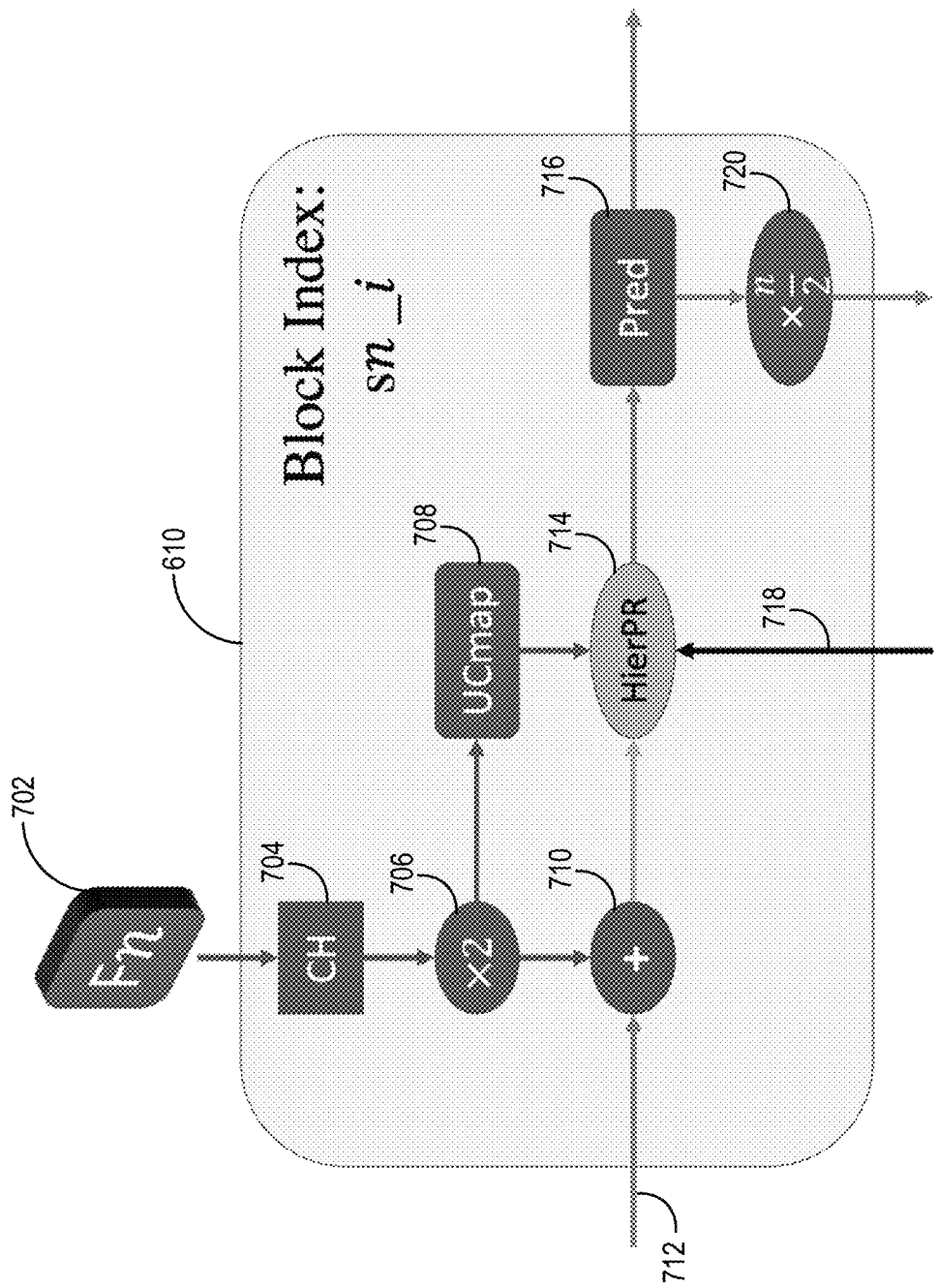
FIG. 7 illustrates an architecture of a hierarchical point-wise refining block of a segmentation refinement neural network accordance with one or more embodiments.

As previously mentioned, in one or more embodiments, the segmentation mask refinement and upsampling system 106 utilizes a hierarchical point-wise refinement map to generate a segmentation mask. In particular, the segmentation mask refinement and upsampling system 106 utilizes the hierarchical point-wise refinement map within the recursive decoder of a mask upsampling and refinement neural network. FIG. 7 illustrates an architecture of a hierarchical point-wise refining block in accordance with one or more embodiments.

Indeed, FIG. 7 illustrates the hierarchical point-wise refining block 610. As shown, the hierarchical point-wise refining block 610 is associated with a block index sn_i. In particular, n represents the output stride associated with the decoded feature map 702 (represented as Fn) received as input from the deconvolution branch. Further, i represents the internal cycle index to which the hierarchical point-wise refining block 610 belongs. Indeed, in one or more embodiments, the block index references a particular hierarchical point-wise refining block within the recursive decoder of the mask upsampling and refinement neural network.

As shown in FIG. 7, the hierarchical point-wise refining block 610 includes a coarse head predictor 704. In one or more embodiments, the coarse head predictor 704 generates a predicted segmentation corresponding to the input of the mask upsampling and refinement neural network based on the decoded feature map 702. For example, in some instances, the coarse head predictor 704 generates a coarse segmentation mask that predicts whether each pixel represented in the coarse segmentation mask corresponds to an object or a background. In one or more embodiments, the coarse head predictor 704 includes a pair of 1×1 convolutional layers, though the coarse head predictor 704 can include fewer or additional layers in other embodiments.

As further shown in FIG. 7, the hierarchical point-wise refining block 610 also includes the operation 706. In one or more embodiments, the hierarchical point-wise refining block 610 utilizes the operation 706 to increase the size (e.g., the resolution) of the coarse segmentation mask generated by the coarse head predictor 704. For example, as shown, in some embodiments, the hierarchical point-wise refining block 610 utilizes the operation 706 to double the size (e.g., resolution) of the coarse segmentation mask.

Additionally, as shown in FIG. 7, the hierarchical point-wise refining block 610 generates an uncertainty map 708 based on the resized coarse segmentation mask. In one or more embodiments, an uncertainty map includes a set of uncertainty scores (i.e., a value that indicates whether the classification of a corresponding pixel is certain or uncertain). For example, in some embodiments, an uncertainty map corresponds to a segmentation mask and includes a collection of uncertainty scores with each uncertainty score corresponding to a pixel of the segmentation mask. Indeed, in some implementations, an uncertainty map includes a one-channel map that gives an uncertainty score for each represented pixel.

In one or more embodiments, the hierarchical point-wise refining block 610 determines the uncertainty scores represented in the uncertainty map 708 by determining, for each pixel of the coarse segmentation mask, the absolute distance between the predicted value (e.g., the value corresponding to the predicted classification) for that pixel and 0.5. In some embodiments, the hierarchical point-wise refining block 610 determines that pixels having a relatively smaller absolute distance are associated with a relatively larger uncertainty as to whether or not the pixel was correctly classified.

In one or more embodiments, the hierarchical point-wise refining block 610 sorts of the pixels of the coarse segmentation mask based on their corresponding uncertainty scores. The hierarchical point-wise refining block 610 further selects a pre-configured number of pixels to refine based on the sorting. Accordingly, in some cases, the hierarchical point-wise refining block 610 selects the pixels associated with the most uncertainty for refinement. In one or more embodiments, the segmentation mask refinement and upsampling system 106 adjusts the pre-configured number of pixels to be selected based on user input, though the pre-configured number of pixels is fixed in other embodiments.

As further shown in FIG. 7, the hierarchical point-wise refining block 610 includes the operation 710. In one or more embodiments, the hierarchical point-wise refining block 610 utilizes the operation 710 to combine the resized coarse segmentation mask with a segmentation mask generated from a previous hierarchical point-wise refining block (shown as input by the arrow 712) where such a segmentation mask is available. For example, in some cases the hierarchical point-wise refining block 610 utilizes the operation 710 to concatenate the resized coarse segmentation mask and the segmentation mask generated from the previous hierarchical point-wise refining block. In some cases, where a segmentation mask from a previous hierarchical point-wise refining block is not available (e.g., the hierarchical point-wise refining block 610 is the first in the recursive decoder), the hierarchical point-wise refining block 610 merely passes through the resized coarse segmentation mask.

Additionally, as shown in FIG. 7, the hierarchical point-wise refining block 610 includes the hierarchical point-wise refining unit 714. In one or more embodiments, the hierarchical point-wise refining unit 714 includes a perceptron. For example, in some implementations, the hierarchical point-wise refining unit 714 includes a multi-layer perceptron (e.g., a three-layer perceptron, a four-layer perceptron, etc.). In one or more embodiments, the hierarchical point-wise refining block 610 utilizes the hierarchical point-wise refining unit 714 to generate a segmentation mask 716. For example, as indicated by FIG. 7, the hierarchical point-wise refining unit 714 generates the segmentation mask 716 based on the uncertainty map 708, the resized coarse segmentation mask, and one or more encoded feature maps from the encoder (shown as input by the arrow 718). Indeed, in some cases, the hierarchical point-wise refining unit 714 utilizes the uncertainty map 708 to identify those pixels of the resized coarse segmentation mask selected for refinement. Further, as shown, the hierarchical point-wise refining unit 714 generates the segmentation mask 716 based on the resized coarse segmentation mask (combined with the segmentation mask from the previous hierarchical point-wise refining block where possible).

As further shown, the hierarchical point-wise refining unit 714 generates the segmentation mask 716 based on one or more encoded feature maps from the encoder (shown as input by the arrow 718). For example, in some implementations, the segmentation mask refinement and upsampling system 106 provides, to the hierarchical point-wise refining block 610, an encoded feature map having a size that corresponds to the size of the resized coarse segmentation mask. Accordingly, the hierarchical point-wise refining unit 714 utilizes feature values from the encoded feature map to refine corresponding pixels from the resized coarse segmentation mask. Thus, the hierarchical point-wise refining unit 714 performs patch refinements at selected pixels with pixel inputs from high-level feature maps.

As further shown in FIG. 7, the hierarchical point-wise refining block 610 includes the operation 720. In one or more embodiments, the hierarchical point-wise refining block 610 utilizes the operation 720 to reduce the output stride associated with the segmentation mask 716. For example, in some implementations, the hierarchical point-wise refining block 610 utilizes the operation to implement half the stride associated with the decoded feature map 702 used as input. It should be understood, however, that the hierarchical point-wise refining block 610 does not implement the operation 720 in some cases, such as when the hierarchical point-wise refining block 610 is the final block in the recursive decoder.

Accordingly, in one or more embodiments, the hierarchical point-wise refining block 610 generates a segmentation mask based on at least one decoded feature map from the deconvolution branch of the recursive decoder. In some cases, the hierarchical point-wise refining block 610 generates the segmentation mask further based on a segmentation mask from a previous hierarchical point-wise refining block. In some implementations, the hierarchical point-wise refining block 610 generates the segmentation mask further based on at least one encoded feature map from the encoder of the mask upsampling and refinement neural network.

Thus, the approach of the segmentation mask refinement and upsampling system 106 described in relation to FIGS. 5A-7 leverages a low-resolution or preliminary segmentation mask, enhances the preliminary segmentation mask, and fuses the preliminary result with a patch-by-patch refined result to generate an improved high-resolution segmentation mask. This approach provides better results than the naïve approach of performing patch-by-patch refinement of an upsampled low-resolution segmentation mask that suffers from lack of overall image information. In particular, FIG. 8 illustrates a segmentation mask 802 generated by the naïve approach of performing patch-by-patch refinement of an upsampled low-resolution segmentation mask compared to an upsampled and refined segmentation mask 804 generated by fusing an upsampled preliminary segmentation mask with a patch-based refined segmentation mask as described above. As shown, the segmentation mask 802 includes artifacts around the eye and the mouth of the cat introduced due to the loss of a global perspective. In contrast, these uncertain areas from the patch-based approached are replaced during the fusing process in the upsampled and refined segmentation mask 804.

Figure 9:
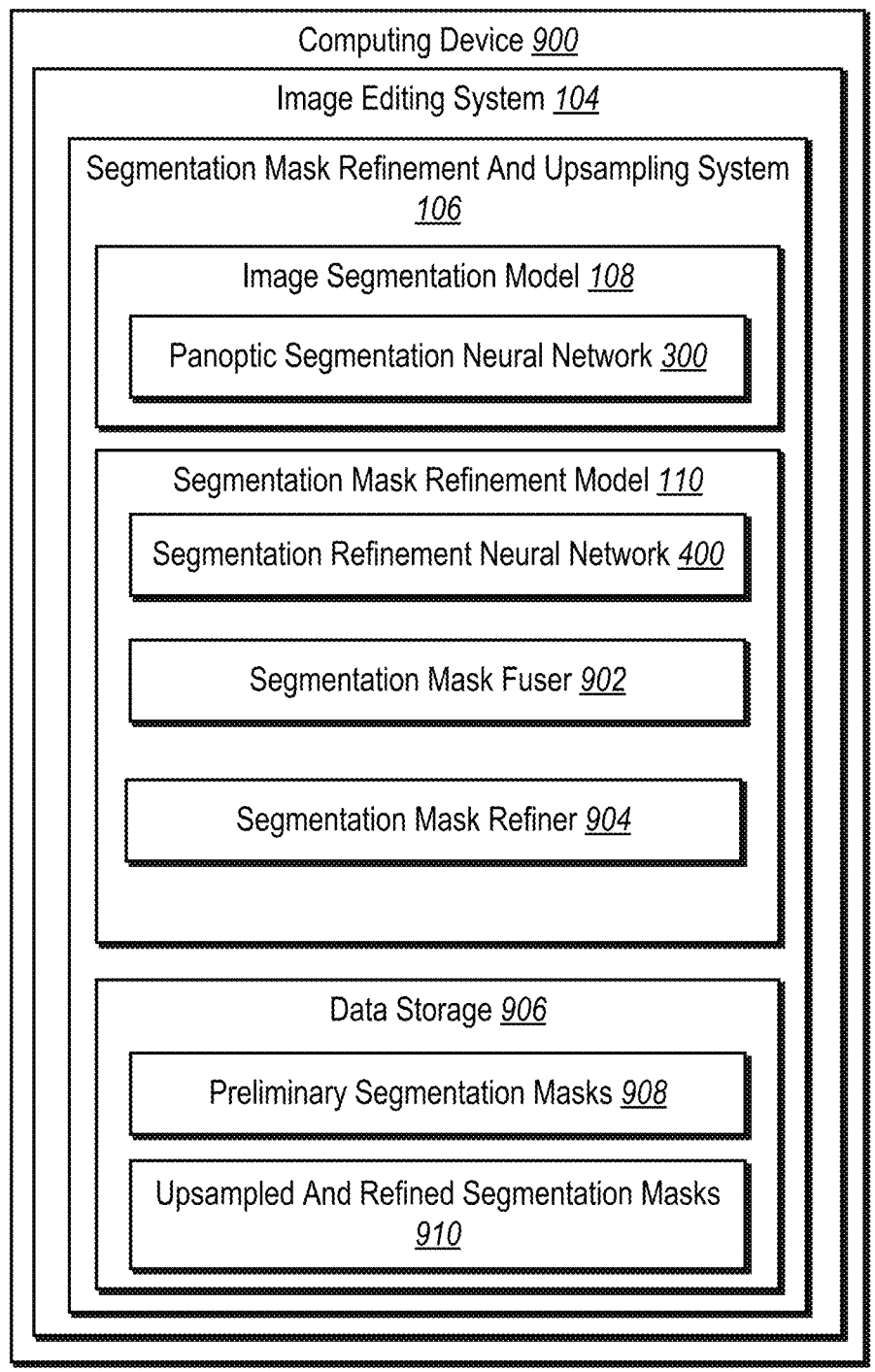
FIG. 9 illustrates an example schematic diagram of a segmentation mask refinement and upsampling system in accordance with one or more implementations.

Referring now to FIG. 9, additional detail is provided regarding the capabilities and components of the segmentation mask refinement and upsampling system 106 in accordance with one or more implementations. In particular, FIG. 9 shows a schematic diagram of an example architecture of the segmentation mask refinement and upsampling system 106 implemented within the image editing system 104 and executed on a computing device 900.

As shown, the segmentation mask refinement and upsampling system 106 is located on a computing device 900 within an image editing system 104. In general, the computing device 900 may represent various types of client devices. For example, in some implementations, the client is a mobile device, such as a laptop, a tablet, a mobile telephone, a smartphone, etc. In other implementations, the computing device 900 is a non-mobile device, such as a desktop or server, or another type of client device. Additional details with regard to the computing device 900 are discussed below as well as with respect to FIG. 11.

As illustrated in FIG. 9, the segmentation mask refinement and upsampling system 106 includes various components for performing the processes and features described herein. For example, the segmentation mask refinement and upsampling system 106 includes the image segmentation model 108, the segmentation mask refinement model 110, and a data storage 906. As shown, the data storage 906 includes preliminary segmentation masks 908 and upsampled and refined segmentation masks 910. Each of the components mentioned above is described below in turn.

The image segmentation model 108 generates preliminary segmentation masks 908 as described above. In one or more implementations, the image segmentation model 108 comprises the panoptic segmentation neural network 300. The segmentation mask refinement model 110 generates upsampled and refined segmentation masks 910 from the preliminary segmentation masks 908 as described above. In one or more implementations, the segmentation mask refinement model 110 comprises the segmentation refinement neural network 400. The segmentation mask refinement model 110 also includes a segmentation mask fuser 902 that fuses upsampled preliminary object masks and patched-based refined segmentation masks. Furthermore, the segmentation mask refinement model 110 also includes a segmentation mask refiner 904 that performs one or more of the refinement processes described above such as guided filtering, morphological operations, etc.

Each of the components of the segmentation mask refinement and upsampling system 106 optionally includes software, hardware, or both. For example, the components optionally include one or more instructions stored on a computer-readable storage medium and executable by processors of one or more computing devices, such as a client device (e.g., a mobile client device) or server device. When executed by the one or more processors, the computer-executable instructions of the segmentation mask refinement and upsampling system 106 causes a computing device to perform segmentation mask generation and surfacing as described herein. Alternatively, the components optionally include hardware, such as a special-purpose processing device to perform a certain function or group of functions. In addition, the components of the segmentation mask refinement and upsampling system 106 optionally includes a combination of computer-executable instructions and hardware.

Furthermore, the components of the segmentation mask refinement and upsampling system 106 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications software packages. The foregoing are either registered trademarks or trademarks of Adobe Inc. in the United States and/or other countries.

FIGS. 1-9, the corresponding text, and the examples provide several different methods, systems, devices, and non-transitory computer-readable media of the segmentation mask refinement and upsampling system 106. In addition to the foregoing, one or more implementations are described in terms of flowcharts comprising acts for accomplishing a particular result, such as the flowcharts of acts shown in FIG. 10. Additionally, the acts described herein may be repeated or performed in parallel with one another or parallel with different instances of the same or similar acts.

Figure 10:
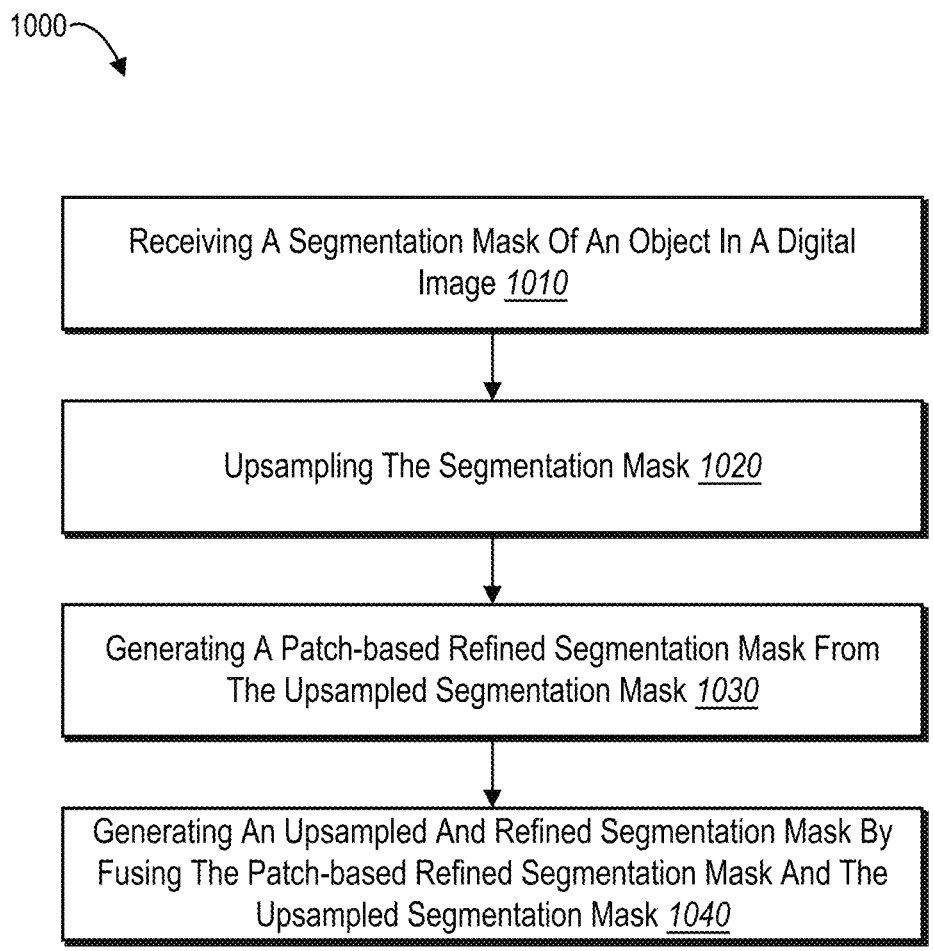
FIG. 10 illustrates a flowchart of a series of acts for generating upsampled and refined segmentation masks in accordance with one or more implementations.

As mentioned, FIG. 10 illustrates a flowchart of a series of acts in accordance with one or more implementations. While FIG. 10 illustrates acts according to one or more implementations, alternative implementations may omit, add to, reorder, and/or modify any of the acts shown. The acts of FIG. 10 are optionally performed as part of a method. Alternatively, a non-transitory computer-readable medium comprises instructions that, when executed by one or more processors, cause a computing device to perform the acts of FIG. 10. In some implementations, a system is configured to perform the acts of FIG. 10.

To illustrate, FIG. 10 shows a flowchart of a series of acts 1000 of refining and upsampling segmentation masks in accordance with one or more implementations. In various implementations, the series of acts 1000 is implemented on one or more computing devices, such as the client device 112 or the server device(s) 102. In addition, in some implementations, the series of acts 1000 is implemented in a digital environment for creating or editing digital content (e.g., digital images). For example, the series of acts 1000 is implemented on one or more computing devices (e.g., server devices) having memory (or memory devices) that includes objects within a plurality of digital images.

The series of acts 1000 includes an act 1010 of generating preliminary segmentation masks for a plurality of objects in a digital image. For instance, the act 1010 includes receiving a segmentation mask of an object in a digital image. In one or more implementations, the act 1010 includes generating the segmentation mask utilizing a panoptic segmentation neural network on a computing device. Act 1010 also involves detecting objects in the digital image utilizing one or more detection heads of the panoptic segmentation neural network. Act 1010 also involves generating, utilizing a masking head of the panoptic segmentation neural network, a preliminary segmentation mask for each object detected in the digital image. Act 1010 also optionally involves generating segmentation masks for the one or more objects utilizing the panoptic segmentation neural network.

As shown, the series of acts 1000 also includes an act 1020 of upsampling the segmentation mask. For instance, the act 1020 involves generating an upsampled segmentation mask by upsampling the segmentation mask from an initial resolution to a higher resolution. In example implementations, the act 1020 involves performing guided upsampling of the segmentation mask.

As shown in FIG. 10, the series of acts 1000 further includes an act 1030 of generating a patch-based refined segmentation mask from the upsampled segmentation mask. For instance, the act 1030 includes generating a patch-based refined segmentation mask by performing a patch-based refinement of the upsampled segmentation mask. In some implementations, the act 1030 includes utilizing patches of a version of the digital image having the higher resolution. In various implementations, the act 1030 utilizing a segmentation refinement neural network to recursively refine the upsampled segmentation mask. In one or more implementations, utilizing the segmentation refinement neural network to recursively refine the upsampled segmentation mask comprises extracting, utilizing an encoder, encoded feature maps from the digital image, generating, utilizing a deconvolution branch of a recursive decoder, decoded feature maps based on the encoded feature maps, and generating, utilizing a hierarchy of hierarchical point-wise refining blocks corresponding to a refinement branch of the recursive decoder, the patch-based refined segmentation mask by recursively refining the upsampled segmentation mask based on the encoded feature maps and the decoded feature maps. Act 1030, in or more implementations, involves generating an uncertainty map based on a decoded feature map from the decoded feature maps; and generating an initially refined segmentation mask based on the uncertainty map and an encoded feature map from the encoded feature maps. Act 1030 also optionally involves determining one or more patches corresponding to the version of the digital image having the higher resolution and generating the patch-based refined segmentation mask based on the upsampled segmentation mask and the one or more patches corresponding to the digital image having the higher resolution.

As shown, the series of acts 1000 also includes an act 1040 of generating an upsampled and refined segmentation mask by fusing the patch-based refined segmentation mask and the upsampled segmentation mask. For instance, the act 1040 involves comprises blending confidence values of the patch-based refined segmentation mask with confidence values of the upsampled segmentation mask. In one or more implementations, the act 1040 includes weighting the confidence values of the patch-based refined segmentation mask and the confidence values of the upsampled segmentation mask based on a distance to an edge or outer border of the patch-based refined segmentation mask or the upsampled segmentation mask. For example, the act 1040, in one or more implementations involves weighting the confidence values comprises giving higher weight to confidence values of the upsampled segmentation mask at positions a threshold distance from the edge or outer border of the patch-based refined segmentation mask or the upsampled segmentation mask. In another example, the act 1040 involves weighting the confidence values comprises giving higher weight to confidence values of the patch-based refined segmentation mask at positions with a threshold distance from the edge or outer border of the patch-based refined segmentation mask or the upsampled segmentation mask.

The series of acts 1000 optionally include additional acts. For example, in one or more implementations, the series of acts 1000 includes modifying the digital image having the higher resolution based on the upsampled and refined segmentation mask. In various implementations, the series of acts 1000 includes performing guided filtering of the segmentation mask before upsampling the segmentation mask. In additional implementations, the series of acts 1000 includes performing one or more of morphological erosion or morphological dilution of the segmentation mask before upsampling the segmentation mask.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the object segmentation system to automatically select objects and partial objects on digital images as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

Figure 11:
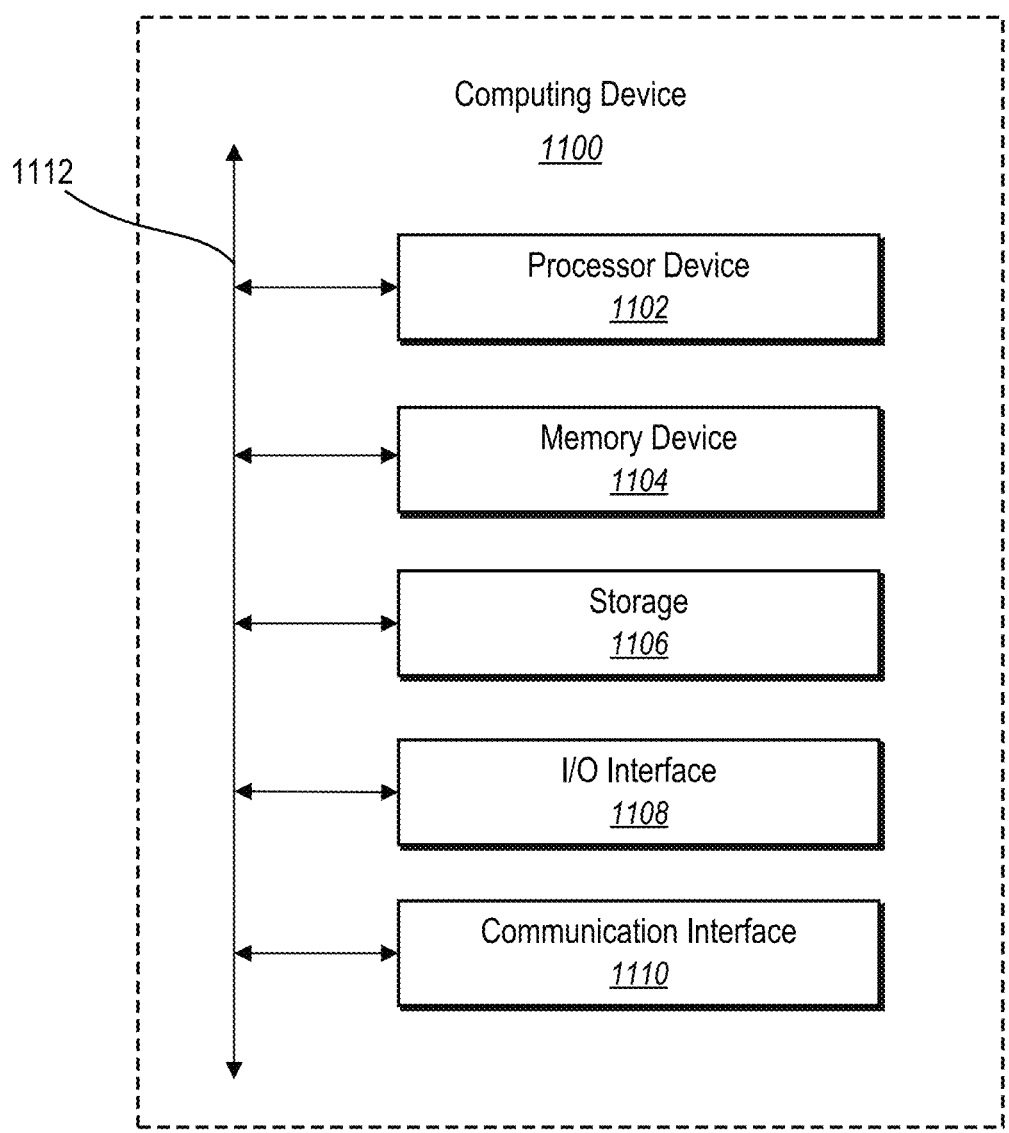
FIG. 11 illustrates a block diagram of an exemplary computing device in accordance with one or more implementations.

FIG. 11 illustrates a block diagram of an example computing device 1100 that may be configured to perform one or more of the processes described above. One will appreciate that one or more computing devices, such as the computing device 1100 may represent the computing devices described above (e.g., the server device(s) 102 and/or the client device 112). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(devices 1102, memory device 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor device(s) 1102 includes hardware for executing instructions, such as those making up a computer program. As an example, and not by way of limitation, to execute instructions, the processor device(s) 1102 may retrieve (or fetch) the instructions from an internal register, an internal cache, memory device 1104, or a storage device 1106 and decode and execute them.

The computing device 1100 includes memory device 1104, which is coupled to the processor device(s) 1102. The memory device 1104 may be used for storing data, metadata, and programs for execution by the processor device(s). The memory device 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory device 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for editing digital images, a computer-implemented method for refining and upsampling segmentation masks comprising:
   receiving a segmentation mask of an object in a digital image;
   generating an upsampled segmentation mask by upsampling the segmentation mask from a lower resolution to a higher resolution;
   generating a patch-based refined segmentation mask by performing a patch-based refinement of the upsampled segmentation mask; and
   generating an upsampled and refined segmentation mask by fusing the patch-based refined segmentation mask and the upsampled segmentation mask.

2. The computer-implemented method of claim 1, wherein performing the patch-based refinement of the upsampled segmentation mask comprises utilizing patches of a version of the digital image having the higher resolution.

3. The computer-implemented method of claim 2, wherein generating the patch-based refined segmentation mask comprises utilizing a segmentation refinement neural network to recursively refine the upsampled segmentation mask.

4. The computer-implemented method of claim 1, wherein fusing the patch-based refined segmentation mask and the upsampled segmentation mask comprises blending confidence values of the patch-based refined segmentation mask with confidence values of the upsampled segmentation mask.

5. The computer-implemented method of claim 4, wherein blending confidence values of the patch-based refined segmentation mask with confidence values of the upsampled segmentation mask comprises weighting the confidence values of the patch-based refined segmentation mask and the confidence values of the upsampled segmentation mask based on a distance to an edge or outer border of the patch-based refined segmentation mask or the upsampled segmentation mask.

6. The computer-implemented method of claim 5, wherein weighting the confidence values comprises giving higher weight to confidence values of the upsampled segmentation mask at positions a threshold distance from the edge or outer border of the patch-based refined segmentation mask or the upsampled segmentation mask.

7. The computer-implemented method of claim 5, wherein weighting the confidence values comprises giving higher weight to confidence values of the patch-based refined segmentation mask at positions with a threshold distance from the edge or outer border of the patch-based refined segmentation mask or the upsampled segmentation mask.

8. The computer-implemented method of claim 3, wherein utilizing the segmentation refinement neural network to recursively refine the upsampled segmentation mask comprises:
    extracting, utilizing an encoder, encoded feature maps from the digital image;
    generating, utilizing a deconvolution branch of a recursive decoder, decoded feature maps based on the encoded feature maps; and
    generating, utilizing a hierarchy of hierarchical point-wise refining blocks corresponding to a refinement branch of the recursive decoder, the patch-based refined segmentation mask by recursively refining the upsampled segmentation mask based on the encoded feature maps and the decoded feature maps.

9. The computer-implemented method of claim 8, wherein generating, utilizing the hierarchy of hierarchical point-wise refining blocks, the patch-based refined segmentation mask comprises:
    generating an uncertainty map based on a decoded feature map from the decoded feature maps; and
    generating an initially refined segmentation mask based on the uncertainty map and an encoded feature map from the encoded feature maps.

10. The computer-implemented method of claim 8, further comprising:
    determining one or more patches corresponding to the version of the digital image having the higher resolution; and
    generating the patch-based refined segmentation mask based on the upsampled segmentation mask and the one or more patches corresponding to the digital image having the higher resolution.

11. The computer-implemented method of claim 2, further comprising modifying the digital image having the higher resolution based on the upsampled and refined segmentation mask.

12. The computer-implemented method of claim 1, further comprising performing guided filtering of the segmentation mask before upsampling the segmentation mask.

13. The computer-implemented method of claim 1, further comprising performing one or more of morphological erosion or morphological dilution of the segmentation mask before upsampling the segmentation mask.

14. A non-transitory computer-readable medium storing instructions thereon that, when executed by at least one processor, cause a computing device to perform operations comprising:
    generating, utilizing an image segmentation model, a preliminary segmentation mask of an object in a digital image;
    generating an upsampled preliminary segmentation mask by upsampling the preliminary segmentation mask from a lower resolution to a higher resolution;
    generating a patch-based refined segmentation mask by performing a patch-based refinement of the upsampled preliminary segmentation mask utilizing a segmentation refinement neural network; and
    generating an upsampled and refined segmentation mask by fusing the patch-based refined segmentation mask and the upsampled preliminary segmentation mask.

15. The non-transitory computer-readable medium of claim 14, wherein fusing patch-based refined segmentation mask and the upsampled preliminary segmentation mask comprises binarizing pixel locations in the upsampled and refined segmentation mask based on confidence values of the patch-based refined segmentation mask and the upsampled preliminary segmentation mask.

16. The non-transitory computer-readable medium of claim 15, wherein binarizing pixel locations in the upsampled and refined segmentation mask comprises utilizing the confidence values of the patch-based refined segmentation mask and the upsampled preliminary segmentation mask to determine whether a given pixel location is part of the object in the digital image or not.

17. The non-transitory computer-readable medium of claim 14, wherein generating, utilizing the image segmentation model, the preliminary segmentation mask of the object in the digital image comprises downsampling the digital image from the higher resolution to the lower resolution and processing the lower resolution digital image utilizing a segmentation neural network.

18. A system comprising:
    at least one memory device comprising a segmentation refinement neural network; and
    at least one processor configured to cause the system to:
        generate an upsampled segmentation mask by upsampling a segmentation mask from a lower resolution to a higher resolution;
        generate a patch-based refined segmentation mask by performing a patch-based refinement of the upsampled segmentation mask utilizing the segmentation refinement neural network; and
        generate an upsampled and refined segmentation mask by fusing the patch-based refined segmentation mask and the upsampled segmentation mask.

19. The system as recited in claim 18, wherein fusing the patch-based refined segmentation mask and the upsampled segmentation mask comprises recapturing global details form the upsampled segmentation mask lost during the patch-based refinement.

20. The system as recited in claim 18, wherein fusing the patch-based refined segmentation mask and the upsampled segmentation mask comprises blending confidence values of the patch-based refined segmentation mask with confidence values of the upsampled segmentation mask and binarizing the upsampled and refined segmentation mask based on the blended confidence values.

\* \* \* \* \*